(12) United States Patent
Kashiwakura et al.

(10) Patent No.: US 10,457,832 B2
(45) Date of Patent: *Oct. 29, 2019

(54) SURFACE-TREATED METAL SHEET AND ORGANIC RESIN-COVERED SURFACE-TREATED METAL SHEET

(71) Applicant: TOYO SEIKAN GROUP HOLDINGS, LTD., Tokyo (JP)

(72) Inventors: Takuya Kashiwakura, Yokohama (JP); Yuji Funagi, Yokohama (JP); Tomohiro Miyai, Yokohama (JP); Arata Sakuragi, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/574,056

(22) PCT Filed: May 18, 2016

(86) PCT No.: PCT/JP2016/064759
§ 371 (c)(1),
(2) Date: Nov. 14, 2017

(87) PCT Pub. No.: WO2016/186138
PCT Pub. Date: Nov. 24, 2016

(65) Prior Publication Data
US 2018/0291232 A1    Oct. 11, 2018

(30) Foreign Application Priority Data

May 21, 2015  (JP) ................................ 2015-103939

(51) Int. Cl.
*C09D 167/02* (2006.01)
*B32B 15/08* (2006.01)
(Continued)

(52) U.S. Cl.
CPC ............. *C09D 167/02* (2013.01); *B05D 1/40* (2013.01); *B05D 3/0272* (2013.01); *B05D 7/14* (2013.01);
(Continued)

(58) Field of Classification Search
CPC ........ C09D 167/02; C09D 7/61; B32B 15/08; B32B 15/09; B32B 15/20; B65D 1/00;
(Continued)

(56) References Cited

U.S. PATENT DOCUMENTS 5,478,872 A * 12/1995 Yamasoe ................. C08L 71/02
524/221
6,565,937 B2   5/2003 Sato et al.
(Continued)

FOREIGN PATENT DOCUMENTS

CN    101395301 A    3/2009
CN    101678644 A    3/2010
(Continued)

OTHER PUBLICATIONS

Communication dated Oct. 30, 2018, from European Patent Office in counterpart application No. 16796531.8.
(Continued)

*Primary Examiner* — Michael Bernshteyn
(74) *Attorney, Agent, or Firm* — Sughrue Mion, PLLC

(57) ABSTRACT

A chromium-free surface-treated metal sheet includes a metal sheet, a surface-treatment coating that contains a polycarboxylic acid type polymer and a zirconium compound and that is formed on at least one surface of the metal sheet, and a coating that contains a polyester resin, a phenol resin and an acid catalyst and that is formed on the surface-treatment coating. The surface-treated metal sheet can be used for producing cans and can lids maintaining excellent dent resistance even for acidic beverages, without permitting (Continued)

the organic resin film formed on the coating to be peeled even under high-temperature and wet environments during a sterilization treatment or the like, and maintaining excellent hot water-resistant adhering property.

14 Claims, 2 Drawing Sheets

(51) Int. Cl.
    *B65D 1/00*     (2006.01)
    *B65D 1/12*     (2006.01)
    *C23C 22/48*     (2006.01)
    *C23C 28/00*     (2006.01)
    *C09D 7/61*     (2018.01)
    *B05D 1/40*     (2006.01)
    *B05D 7/14*     (2006.01)
    *B32B 15/09*     (2006.01)
    *B32B 15/20*     (2006.01)
    *B05D 3/02*     (2006.01)
    *B05D 7/00*     (2006.01)

(52) U.S. Cl.
    CPC .............. *B05D 7/544* (2013.01); *B32B 15/08* (2013.01); *B32B 15/09* (2013.01); *B32B 15/20* (2013.01); *B65D 1/00* (2013.01); *B65D 1/12* (2013.01); *C09D 7/61* (2018.01); *C23C 22/48* (2013.01); *C23C 28/00* (2013.01); *B32B 2255/06* (2013.01); *B32B 2255/26* (2013.01); *B32B 2439/66* (2013.01)

(58) Field of Classification Search
    CPC ........... B65D 1/12; C23C 22/48; C23C 28/00; B05D 1/40; B05D 3/0272; B05D 7/14; B05D 7/544
    USPC ........................................................ 428/35.9
    See application file for complete search history.

(56) References Cited

U.S. PATENT DOCUMENTS

| | | | |
|---|---|---|---|
| 8,349,419 | B2 | 1/2013 | Nishida et al. |
| 8,871,351 | B2 | 10/2014 | Yaoi et al. |
| 2009/0218228 | A1 | 9/2009 | Inbe et al. |
| 2010/0215965 | A1 | 8/2010 | Tadaki et al. |
| 2010/0260953 | A1 | 10/2010 | Tadaki et al. |
| 2012/0261033 | A1 | 10/2012 | Inbe et al. |
| 2015/0056390 | A1* | 2/2015 | Miyai ..................... C23C 22/34 428/35.8 |

FOREIGN PATENT DOCUMENTS

| | | | | |
|---|---|---|---|---|
| CN | 101678645 | A | | 3/2010 |
| EP | 1241236 | A2 | * | 9/2002 ......... C09D 133/066 |
| EP | 2 578 727 | A1 | | 4/2013 |
| EP | 2 832 897 | A1 | | 2/2015 |
| JP | 2001-246695 | A | | 9/2001 |
| JP | 2002-338881 | A | | 11/2002 |
| JP | 2002338881 | A | * | 11/2002 |
| JP | 2003-246006 | A | | 9/2003 |
| JP | 2005281863 | A | * | 10/2005 |
| JP | 2007-076012 | A | | 3/2007 |
| JP | 2008-297594 | A | | 12/2008 |
| JP | 2008297594 | A | * | 12/2008 |
| JP | 2012-031221 | A | | 2/2012 |
| JP | 2012-031223 | A | | 2/2012 |
| JP | 2012031221 | A | * | 2/2012 |
| WO | 2007/091740 | A1 | | 8/2007 |
| WO | 2007/100018 | A1 | | 9/2007 |

OTHER PUBLICATIONS

International Search Report for PCT/JP2016/064759 dated Jun. 21, 2016 [PCT/ISA/210].

* cited by examiner

SURFACE-TREATED METAL SHEET AND ORGANIC RESIN-COVERED SURFACE-TREATED METAL SHEET

CROSS REFERENCE TO RELATED APPLICATIONS

This application is a National Stage of International Application No. PCT/JP2016/064759 filed May 18, 2016, claiming priority based on Japanese Patent Application No. 2015-103939 filed May 21, 2015, the contents of all of which are incorporated herein by reference in their entirety.

TECHNICAL FIELD

This invention relates to a surface-treated metal sheet and an organic resin-covered surface-treated metal sheet used for producing cans. More specifically, the invention relates to a chromium-free surface-treated metal sheet and an organic resin-covered surface-treated metal sheet capable of providing cans and can lids having excellent dent resistance to cope with even acidic beverages, without permitting the organic resin film to be peeled even under high-temperature and wet environments such as of sterilization treatment, and having excellent hot water-resistant adhering property.

BACKGROUND ART

Organic resin-covered metal sheets obtained by covering a metal sheet such as of aluminum with an organic resin have long been known as materials for producing cans. It has also been well-known to subject this laminated material to draw-working or draw-ironing to produce seamless cans for containing beverages, or to press-form the laminated material to produce can lids such as easy-to-open ends. For instance, an organic resin-covered metal sheet having, as an organic resin film, a thermoplastic resin film of a polyester resin comprising chiefly an ethylene terephthalate unit has been widely used as a material for producing seamless cans (patent document 1).

A seamless can made from the organic resin-covered metal sheet is filled with the content and is sealed. Here, if the seamless can is applied with an external shock (dented) as a result of falling or the like, the metal material may undergo deformation at that part. At the same time, the organic resin film may often be cracked due to the shock and deformation of the metal material. The portion where the organic resin film is cracked may cause corrosion. If the content filled therein is a strongly corrosive acidic beverage, then the can body may often be perforated due to the corrosion. It is, therefore, important that the can does not corrode despite it is applied with an impact or shock as a result of falling or the like. This property is called dent resistance. Excellent dent resistance has now been desired to cope with even the strongly corrosive contents.

As a metal sheet used as an organic resin-covered metal sheet for producing cans, on the other hand, there has generally been used a metal sheet having surfaces treated by conversion treatment in an attempt to improve corrosion resistance and adhesion (hot water-resistant adhering property) between the organic resin film and the metal material under high-temperature and wet environments such as of sterilization treatment after filling with a content and sealing. The surface treatment of this kind may be, for example, a treatment with chromium phosphate. The organic resin-covered surface-treated metal sheet comprising a metal sheet with its surface being treated with the chromium phosphate can be formed into a seamless can. When filled with the content, sealed and is subjected to the sterilization, the seamless can features excellent hot water-resistant adhering property between the organic resin film and the metal material and has, therefore, been widely used. From the viewpoint of environmental protection, however, it has been increasingly demanded to employ a chromium-free surface treatment. Moreover, the surface-treatment coating formed by the treatment with the chromium phosphate is a hard inorganic film which tends to be easily cracked during the forming treatment or when an external shock is given thereto. Namely, the surface-treatment coating formed by the treatment with the chromium phosphate is accompanied by a defect in regard to work followability and resistance against shocks. Despite of using the organic resin-covered surface-treated metal sheet obtained by treating the surface of the metal sheet with the chromium phosphate, therefore, there has not yet been obtained a seamless can that satisfies the above dent resistance.

So far, a number of chromium-free surface treatments have been proposed for the materials for producing cans. For instance, a conversion treatment of the organic/inorganic composite type using a zirconium compound, a phosphorous compound and a phenol resin has been proposed for the seamless aluminum cans covered with an organic resin, exhibiting hot water-resistant adhering property comparable to those attained by the treatment with the chromium phosphate (patent document 2).

Despite of using the above chromium-free surface-treated metal sheet, however, there has not yet been obtained a seamless can that satisfies the dent resistance.

Further, as a method of improving the corrosion resistance and close adhesion of the organic resin-covered surface-treated metal sheet having a chromium-free surface-treatment coating, there has been proposed an art of forming a primer coating under the organic resin film. For instance, there has been proposed a resin-covered aluminum alloy sheet obtained by covering an aluminum alloy sheet with a polyester film via a primer coating that comprises a polyester resin and a phenol resin, the aluminum alloy sheet forming thereon an organic/inorganic composite surface-treating layer that comprises a zirconium compound and/or a titanium compound and an organic compound (patent document 3).

PRIOR ART DOCUMENTS

Patent Documents

Patent document 1: JP-A-2001-246695
Patent document 2: JP-A-2007-76012
Patent document 3: WO2007/091740

OUTLINE OF THE INVENTION

Problems that the Invention is to Solve

The above technologies have been proposed for easy-open lids. When adapted to seamless cans that are subjected to severe working such as draw working, however, satisfactory dent resistance was not obtained. Besides, it cannot be said that the hot water-resistant adhering property between the chromium-free surface-treated film and the primer coating is necessarily sufficient. Therefore, in case tiny scratches were formed near the mouth portion of the can at the time of forming the can or after the can has been formed (at the time of necking•flanging work or wrap-seaming work), there would remain a probability that the organic resin film might peel (delaminate) off the interface between the surface-treatment coating at the scratched portion and the primer coating due to the sterilization treatment such as the pasteurization treatment (treatment with the shower of hot water) or the retort treatment that is conducted after filling with the content.

It is, therefore, an object of the present invention to provide a chromium-free surface-treated metal sheet and an organic resin-covered surface-treated metal sheet that exert small load on the environment, and that are capable of providing cans and can lids that have excellent dent resistance and can cope with even the strongly corrosive contents, the cans and can lids having excellent hot water-resistant adhering property without permitting the organic resin film to be peeled even under high-temperature and wet environments such as of sterilization treatment in a state where tiny scratches have been formed due to the working.

Means for Solving the Problems

According to the present invention, there is provided a surface-treated metal sheet comprising a metal sheet, a surface-treatment coating that contains a polycarboxylic acid type polymer and a zirconium compound and that is formed on at least one surface of the metal sheet, and a coating that contains a polyester resin, a phenol resin and an acid catalyst and that is formed on the surface-treatment coating.

In the surface-treated metal sheet of the present invention, it is desired that:
1. When the surface-treatment coating is measured for its infrared absorption spectra, a peak height ratio ($\beta/\alpha$) of a maximum absorption peak height ($\alpha$) in a wave number range of 1660 to 1760 $cm^{-1}$ and a maximum absorption peak height ($\beta$) in a wave number range of 1490 to 1659 $cm^{-1}$ is from 0.20 to 2.54;
2. The polycarboxylic acid type polymer is a polymer or a copolymer obtained by the polymerization of at least one kind of polymerizable monomer selected from acrylic acid, methacrylic acid, itaconic acid and maleic acid, or is a mixture thereof;
3. The zirconium compound is a zirconium compound derived from an oxyzirconium salt;
4. In the surface-treatment coating, the content of the polycarboxylic acid type polymer is 10 to 100 mg/$m^2$ in terms of carbon and the content of the zirconium compound is 2 to 80 mg/$m^2$ calculated as zirconium;
5. The polyester resin has a glass transition temperature (Tg) of 15° C. to 80° C.;
6. The polyester resin contains an aromatic dicarboxylic acid and an aliphatic dicarboxylic acid having 6 to 14 carbon atoms as the dicarboxylic acid components for constituting the polyester resin, the molar ratio of the aromatic dicarboxylic acid and the aliphatic dicarboxylic acid having 6 to 14 carbon atoms being 95:5 to 80:20;
7. The phenol resin is the one in which a methylol group of the phenol resin derived from the m-cresol is alkoxymethylated with an n-butanol;
8. The phenol resin is contained in an amount of 5 to 50 parts by mass per 100 parts by mass of the polyester resin; and
9. The coating is formed by using an aqueous coating composition that contains a water-soluble and/or a water-dispersible polyester resin, a phenol resin, an acid catalyst and an aqueous medium.

According to the present invention, further, there is provided an organic resin-covered surface-treated metal sheet obtained by forming an organic resin film on the coating formed on the surface-treatment coating of the surface-treated metal sheet.

In the organic resin-covered surface-treated metal sheet of the present invention, it is desired that the organic resin film is a polyester resin film.

The present invention, further, provides a can body made from the organic resin-covered surface-treated metal sheet.

The invention, further, provides a can lid made from the surface-treated metal sheet or the organic resin-covered surface-treated metal sheet.

Effects of the Invention

The surface-treated metal sheet of the present invention has a surface-treatment coating and a coating in combination. The a surface-treatment coating contains a polycarboxylic acid type polymer and a zirconium compound (hereinafter often referred to simply as "surface-treatment coating") and the coating contains a polyester resin, a phenol resin and an acid catalyst (hereinafter often referred to simply as "polyester coating"). Further, an organic resin film is formed thereon to thereby obtain an organic resin-covered surface-treated metal sheet. A seamless can formed by using the above organic resin-covered surface-treating metal sheet exhibits excellent dent resistance to cope with even the strongly corrosive contents such as acidic beverages and, further, exhibits excellent hot water-resistant adhering property without permitting the organic resin film to peel off even when subjected to the sterilization treatment in a state where scratches have been formed due to the working. Moreover, the surface-treatment coating of the present invention is formed by the chromium-free surface treatment and offers an advantage of exerting little load on the environment.

Further, when the surface-treatment coating is measured for its infrared absorption spectra, a peak height ratio ($\beta/\alpha$) of a maximum absorption peak height ($\alpha$) in a wave number range of 1660 to 1760 $cm^{-1}$ and a maximum absorption peak height ($\beta$) in a wave number range of 1490 to 1659 $cm^{-1}$ lies in the above-mentioned range contributing to further improving the hot water-resistant adhering property.

As the polyester resin for forming the polyester coating, further, there is used a special polyester resin having a glass transition temperature (Tg) lying in the above-mentioned range contributing to further improving the dent resistance and the hot water-resistant adhering property.

Moreover, the polyester coating is formed by using an aqueous coating composition that contains a water-soluble and/or a water-dispersible polyester resin, a phenol resin, an acid catalyst and an aqueous medium. In this case, the medium is mostly water and is, therefore, advantageous in economy as compared to when the polyester coating is formed by using a coating composition of the type of an organic solvent, offering an advantage of reducing load exerted on the environment.

The above-mentioned actions and effects of the surface-treated metal sheet of the present invention will also become obvious from the results of Examples appearing later.

That is, in the case of the organic resin-covered surface-treated metal sheet without forming the polyester coating but forming the organic resin film on the surface-treatment coating that contains the polycarboxylic acid type polymer and the zirconium compound, the organic resin film does not peel off and a favorable hot water-resistant adhering property is obtained in the test for examining the hot water-resistant adhering property. In the test for examining the dent resistance, however, corrosion is seen on the whole inner surface of the dented portion, and satisfactory dent resistance is not obtained (Comparative Example 1). In the case of the organic resin-covered surface-treated metal sheet obtained by forming the polyester coating on the metal sheet without forming the surface-treatment coating, and, further, forming the organic resin film thereon, on the other hand, corrosion is suppressed in the dented portion and favorable dent resistance is obtained in the test for examining the dent resistance. However, the test for examining the hot water-resistant adhering property proves that the organic resin film is peeled off and sufficiently large hot water-resistant adhering property is not obtained (Comparative Example 2).

In the case of the organic resin-covered surface-treated metal sheet obtained by forming the organic resin film on the surface-treatment coating that contains the polycarboxylic acid type polymer and the zirconium compound via the polyester coating, on the other hand, there are obtained favorable results in both the test for examining the dent resistance and the test for examining the hot water-resistant adhering property. It is, therefore, learned that excellent dent resistance and hot water-resistant adhering property have been attained (Examples 1 to 36). Therefore, in order for the seamless cans subjected to severe workings to exhibit both excellent dent resistance and excellent hot water-resistant adhering property, it is important that both the surface-treatment coating and the polyester coating are formed.

Figure 1:
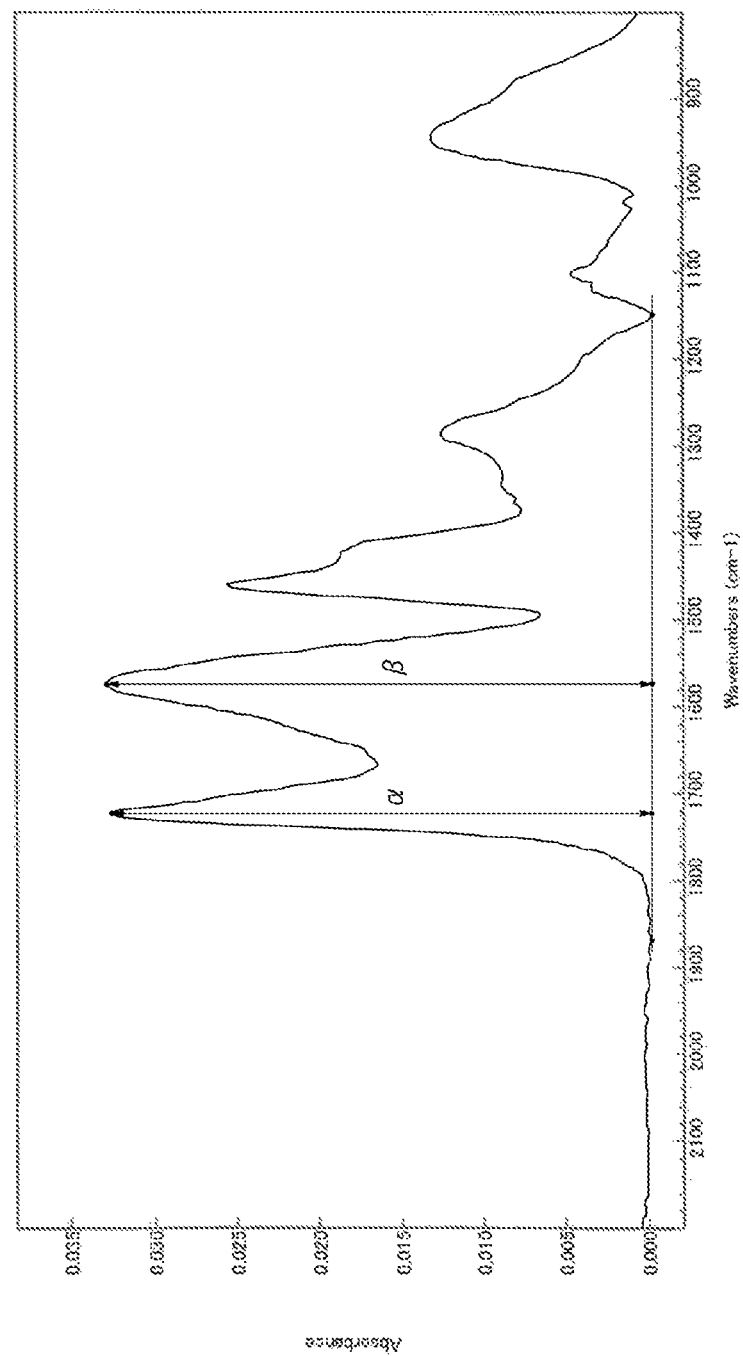
FIG. 1 It shows infrared absorption spectra of a surface-treatment coating on a surface-treated metal sheet.

MODES FOR CARRYING OUT THE INVENTION (Surface-Treatment Coating)

In the surface-treated metal sheet of the present invention, the surface-treatment coating contains at least a polycarboxylic acid type polymer and a zirconium compound. Therefore, the surface-treatment coating favorably and adheres to both the polyester coating formed on the surface-treatment coating and the metal sheet via a carboxyl group contained in the polycarboxylic acid type polymer. Moreover, with the carboxyl group being crosslinked with the zirconium compound, the film exhibits greatly improved heat resistance and water-proof property. As a result, the film maintains cohesive force even under high-temperature and wet environment such as of sterilization treatment, i.e., maintains power for adhering to both the polyester coating and the metal material exhibiting, as a result, excellent hot water-resistant adhering property.

In the invention, further, when the surface-treatment coating is measured for its infrared absorption spectra, a peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ lies in the above-mentioned range. Further, a crosslinking ratio defined by a formula described later and from the above peak height ratio ($\beta/\alpha$) lies in a predetermined range. In this case, the hot water-resistant adhering property is further improved presumably due to the reasons described below.

In the surface-treatment coating, if the polycarboxylic acid type polymer is crosslinked with the zirconium compound, the carboxyl group contained in the polycarboxylic acid type polymer reacts with zirconium to form a metal salt of carboxyl group and zirconium.

In the measurement of infrared absorption spectra, a free carboxyl group (—COOH) that is not forming a metal salt with zirconium exhibits an absorption peak due to C═O stretching vibration of the carboxyl group that has an absorption maximum near 1720 cm$^{-1}$ in a wave number range of 1660 to 1760 cm$^{-1}$. On the other hand, a carboxyl group (—COO$^-$) that is forming a metal salt with zirconium exhibits an absorption peak due to C═O stretching vibration of the metal salt of the carboxyl group that has an absorption maximum near 1560 cm$^{-1}$ in a wave number range of 1490 to 1659 cm$^{-1}$. The absorbency of the surface-treatment coating varies in proportion to the amount of the chemical species that has infrared activity in the surface-treatment coating. Therefore, the peak height ratio ($\beta/\alpha$) of a maximum absorption peak height ($\alpha$) in a wave number range of 1660 to 1760 cm$^{-1}$ and a maximum absorption peak height ($\beta$) in a wave number range of 1490 to 1659 cm$^{-1}$ represents the ratio of the amount of the free carboxyl groups (—COOH) that are not forming the metal salt with zirconium and the amount of the carboxyl groups (—COO$^-$) that are forming the metal salt with zirconium. As this value increases, the amount of the free carboxyl groups (—COOH) decreases and the amount of the carboxyl groups (—COO$^-$) forming the metal salt with zirconium increases.

In the surface-treatment coating of the present invention, it is desired that the peak height ratio ($\beta/\alpha$) is in a range of 0.20 to 2.54, preferably, 0.35 to 1.94, more preferably, 0.45 to 1.60, further preferably, 0.60 to 1.48 and, particularly preferably, 0.75 to 1.48.

The crosslinking ratio referred to in the invention represents a degree of crosslinking of the polycarboxylic acid type polymer with the zirconium compound. Namely, the crosslinking ratio is a measure of the amount (mol %) of the carboxyl groups forming the metal salt with zirconium to the whole carboxyl groups (sum of the carboxyl groups forming no metal salt with the zirconium compound and the carboxyl groups forming the metal salt with the zirconium compound) contained in the polycarboxylic acid type polymer in the surface-treatment coating. In the invention, a value X calculated from the maximum absorption peak height ($\alpha$) in the wave number range of 1660 to 1760 cm$^{-1}$, from the maximum absorption peak height ($\beta$) in the wave number range of 1490 to 1659 cm$^{-1}$ and from the peak height ratio ($\beta/\alpha$) in compliance with the following formula (1), is defined as the crosslinking ratio.

$$X(\%) = \{\beta/[\alpha+\beta]\} \times 100 \qquad (1)$$
$$= \{(\beta/\alpha)/[1+(\beta/\alpha)]\} \times 100$$

In the surface-treatment coating of the present invention, it is desired that the crosslinking ratio is in a range of 17 to 72%, preferably, 26 to 66%, more preferably, 31 to 62%, further preferably, 38 to 60% and, particularly preferably, 43 to 60%.

If the peak height ratio ($\beta/\alpha$) and the crosslinking ratio are lying within the above-mentioned ranges, then the surface-treatment coating contains much free carboxyl groups (carboxyl groups that are forming no metal salt with the zirconium compound). Therefore, the surface-treatment coating favorably and adheres to the polyester coating via the free carboxyl groups, stays flexible to a sufficient degree, and follows the metal material even in case a seamless can is formed through a severe working such as draw-ironing. As a result, the polyester coating and the surface-treatment coating firmly and adheres to each other even under a high-temperature and wet environment such as of sterilization treatment, exhibiting further improved hot water-resistant adhering property.

If the peak height ratio (β/α) and the crosslinking ratio become larger than the above-mentioned ranges, then the surface-treatment coating contains fewer free carboxyl groups. Therefore, the power to adhere to the polyester coating decreases and, at the same time, the degree of crosslinking increases. Therefore, it may be difficult for the surface-treating layer to follow the metal material and, as a result, its hot water-resistant adhering property may deteriorate. If the peak height ratio (β/α) and the crosslinking ratio are smaller than the above-mentioned ranges, on the other hand, the crosslinking is not formed to a sufficient degree. Therefore, the surface-treatment coating exhibits decreased water-proof property and heat resistance, tends to easily undergo cohesive breakage under a high-temperature and wet environment, may exhibit deteriorated hot water-resistant adhering property, absorbs much water permitting the whole surfaces to be corroded and, therefore, may exhibit deteriorated dent resistance.

The surface-treatment coating of the organic resin-covered surface-treated metal sheet of the present invention contains the polycarboxylic acid type polymer in an amount in a range of 10 to 100 mg/m$^2$ calculated as carbon, preferably, 12 to 50 mg/m$^2$ and, more preferably, 21 to 50 mg/m$^2$, and contains the zirconium compound in an amount in a range of 2 to 80 mg/m$^2$ calculated as zirconium (metal) and, more preferably, 4 to 41 mg/m$^2$. If the amounts of the polycarboxylic acid type polymer and the zirconium compound are larger than the above ranges, it becomes difficult to adjust the peak height ratio and the crosslinking ratio to lie within the above-mentioned ranges, or the film becomes unnecessarily thick, which is uneconomical. If the amount of the polycarboxylic acid type polymer or the zirconium compound is smaller than the above range, on the other hand, it becomes difficult to adjust the peak height ratio (β/α) and the crosslinking ratio to lie within the above-mentioned ranges, or the thickness of film becomes smaller than the required thickness, and the hot water-resistant adhering property may not be exhibited to a sufficient degree.

The surface-treatment coating of the organic resin-covered surface-treated metal sheet of the present invention has a composition which contains the zirconium compound in an amount calculated as zirconium (metal) of 7.4 to 74 parts by mass, preferably, 14 to 60 parts by mass, more preferably, 18 to 52 parts by mass, further preferably, 22 to 48 parts by mass and, particularly preferably, 29 to 48 parts by mass per 100 parts by mass of the solid component of the polycarboxylic acid type polymer. If the amount of the zirconium compound is larger or smaller than the above range, it may often become difficult to adjust the crosslinking ratio to lie within the above-mentioned range and desired effects may not often be obtained.

(Polycarboxylic Acid Type Polymer)

As the polycarboxylic acid type polymer that constitutes the surface-treatment coating in the invention, there can be used a conventionally known polycarboxylic acid type polymer. The conventionally known polycarboxylic acid type polymer is a general term of the polymers having two or more carboxyl groups in a molecule thereof. Concretely, there can be exemplified a homopolymer that uses an ethylenically unsaturated carboxylic acid as a polymerizable monomer, and a copolymer that uses at least two kinds of the ethylenically unsaturated acids only as monomer components, as well as a copolymer of an ethylenically unsaturated carboxylic acid and other ethylenically unsaturated monomer and, further, acidic polysaccharides having carboxyl groups in the molecules thereof, such as arginic acid, carboxymethyl cellulose and pectin. These polycarboxylic acid type polymers can be used in a single kind or in a mixture of at least two kinds of polycarboxylic acid type polymers.

Here, representative examples of the ethylenically unsaturated carboxylic acid include acrylic acid, methacrylic acid, itaconic acid, maleic acid, fumaric acid and crotonic acid. Among them, preferred examples are acrylic acid, methacrylic acid, itaconic acid and maleic acid.

Further, as the ethylenically unsaturated monomer copolymerizable therewith, there can be representatively exemplified α-olefins such as ethylene and propylene; vinyl carboxylate esters such as vinyl acetate; unsaturated carboxylic acid esters such as alkyl acrylate, alkyl methacrylate and alkyl itaconate; and acrylonitrile, vinyl chloride, vinylidene chloride, vinyl fluoride, vinylidene fluoride, acrylamide and styrene.

When the polycarboxylic acid polymer is a copolymer of an ethylenically unsaturated carboxylic acid with vinyl carboxylate esters such as vinyl acetate, then the polymer may further be saponified so that the ester moiety of the saturated vinyl carboxylate is transformed into a vinyl alcohol.

Among such polycarboxylic acid type polymers, desired are the polymers containing constituent units derived from at least one kind of polymerizable monomer selected from the acrylic acid, methacrylic acid, itaconic acid and maleic acid, or a mixture of such polymers. The polymer may be a homopolymer or a copolymer. It is desired that the polymer contains the constituent units derived from at least one kind of the polymerizable monomer selected from the acrylic acid, maleic acid, methacrylic acid and itaconic acid in an amount of not less than 60 mol %, preferably, not less than 80 mol % and, most preferably, 100 mol % (here, however, the whole constituent units are regarded to be 100 mol %). Namely, it is desired that the polycarboxylic acid type polymer is a polymer comprising at least one kind of a polymerizable monomer selected from the acrylic acid, maleic acid, methacrylic acid and itaconic acid. If the constituent units other than the above constituent units are contained, then the other constituent units should be ethylenically unsaturated monomers copolymerizable with the above-mentioned ethylenically unsaturated carboxylic acid. Further, if the polycarboxylic acid type polymer is a polymer comprising at least one kind of polymerizable monomer selected from the acrylic acid, maleic acid, methacrylic acid and itaconic acid, there can be used a homopolymer of polymerizable monomers thereof, a copolymer thereof, or a mixture thereof. More desirably, there can be used the polyacrylic acid, polymethacrylic acid polyitaconic acid, polymaleic acid and a mixture thereof.

As for the polycarboxylic acid type polymer used in the invention, further, the carboxyl groups possessed by the polycarboxylic acid type polymer may have partly been neutralized beforehand with a basic compound within a range in which the object of the invention is not impaired. As the basic compound, there can be exemplified hydroxides of alkali metals such as sodium hydroxide, potassium hydroxide and lithium hydroxide, as well as various amine compounds such as ammonia and the like.

The polycarboxylic acid type polymer that constitutes the surface-treatment coating of the present invention has a weight average molecular weight (Mw) in a range of, though not limited thereto only, 3,000 to 1,000,000, preferably, 10,000 to 1,000,000, and more preferably, 10,000 to 500,000. If the weight average molecular weight is smaller than the above range, the surface-treatment coating may often exhibit deteriorated hot water-resistant adhering property. If the weight average molecular weight is not smaller than the above range, on the other hand, the surface-treating solution may be less stable, may undergo gelation as it ages, and may cause a decrease in the productivity.

(Zirconium Compound)

As the zirconium compound that constitutes the surface-treatment coating of the invention, there can be exemplified zirconium oxide, hexafluorozirconic acid ($H_2ZrF_6$), potassium hexaflurozirconium ($K_2ZrF_6$), ammonium hexafluorozirconium (($NH_4)_2ZrF_6$), ammonium zirconium carbonate (($NH_4)_2ZrO(CO_3)_2$), zirconium oxynitrate ($ZrO(NO_3)_2$), zirconium oxyacetate ($ZrO(C_2H_3O_2)_2$), zirconium oxychloride ($ZrOCl_2$), zirconium oxysulfate ($ZrOSO_4$), zirconium oxycarbonate ($ZrOCO_3$), zirconium oxyoctylate ($ZrO(C_8H_{15}O_2)_2$), oxyzirconium hydroxide ($ZrO(OH)_2$), zirconium hydroxide oxychloride ($ZrO(OH)Cl$), potassium zirconium carbonate ($K_2(ZrO(CO_3)_2)$), zirconium phosphate, zirconium lactate, zirconium acetylacetonate [$Zr(OC(=CH_2)CH_2COCH_3)_4$] and the like.

Among the above zirconium compounds, it is desired to use those that do not contain fluorine component from the standpoint of load upon the environment and, specifically, to use an oxyzirconium salt. Here, the "oxyzirconium salt" stands for a salt that is expressed as ZrO and that contains a positive divalent group (called zirconyl). As the oxyzirconium salt, there can be exemplified ammonium zirconium carbonate (($NH_4)_2ZrO(CO_3)_2$), zirconium oxynitrate ($ZrO(NO_3)_2$), zirconium oxyacetate ($ZrO(C_2H_3O_2)_2$), zirconium oxychloride ($ZrOCl_2$), zirconium oxysulfate ($ZrOSO_4$), zirconium oxycarbonate ($ZrOCO_3$), oxyzirconium hydroxide ($ZrO(OH)_2$), zirconium hydroxide oxychloride ($ZrO(OH)Cl$), potassium zirconium carbonate ($K_2(ZrO(CO_3)_2)$) and the like. Among them, it is desired to use the water-soluble oxyzirconium salt and, specifically, the ammonium zirconium carbonate as a precursor from the standpoint of stability in the form of a treating solution and hot water-resistant adhering property.

When the above-mentioned water-soluble oxyzirnium salt (ammonium zirconium carbonate) is used as the zirconium compound, it is desired that the surface-treatment coating contains the oxyzirconium salt in an amount in a range, calculated as zirconium oxide ($ZrO_2$), of 10 to 100 parts by mass, preferably, 20 to 80 parts by mass, more preferably, 25 to 70 parts by mass, further preferably, 30 to 65 parts by mass and, particularly preferably, 40 to 65 parts by mass per 100 parts by mass of the polycarboxylic acid type polymer.

(Others)

The surface-treatment coating of the invention can be formed by using the above-mentioned polycarboxylic acid type polymer and the zirconium compound only, but may further contain colloidal silica. Containing the colloidal silica, the surface-treatment coating exhibits further improved heat resistance, suppresses the cohesive breakage that may take place therein in the step of heat treatment (heat set) that is conducted for removing the residual strain in the organic resin film after the can has been formed. Therefore, the organic resin film can be often suppressed from being peeled (delaminated) at portions corresponding to the flanges. As the colloidal silica, though not limited thereto, there can be exemplified spherical silica, such as SNOWTEX N, SNOWTEX UP (produced by Nissan Chemical Industries, Ltd.), and LUDOX (produced by W.R. Grace and Company). The colloidal silica has a grain size, desirably, in a range of 4 to 80 nm and, specifically, 4 to 30 nm. Usually, the grains smaller than the above range are not easily available. The colloidal silica having a grain size larger than the above range, on the other hand, cannot be homogeneously distributed in the surface-treatment coating, and its effect cannot be easily obtained.

It is, further, desired that the content of the colloidal silica in the surface-treatment coating calculated as silicon is in a range of 5 to 200 mg/m$^2$ and, specifically, 10 to 100 mg/m$^2$. With the content of the colloidal silica lying in the above range, the above-mentioned effects can be expected. If the content of the colloidal silica is smaller than the above range, then the effects cannot be expected. On the other hand, even if the content of the colloidal silica is larger than the above range, no further improved effects are obtained but rather the hot water-resistant adhering property may deteriorate.

The surface-treatment coating of the invention can be used being mixed with, or containing therein, metal compounds other than the zirconium compound (e.g., monovalent alkali metal compounds such as sodium and potassium, or polyvalent metal compounds such as zinc, calcium and aluminum).

The surface-treatment coating of the invention may further contain water-soluble polymers such as polyvinyl alcohol, ethylene-vinyl alcohol copolymer, polyvinyl pyrrolidone, polyvinyl ethyl ether, polyacrylamide, acrylamide type compound, polyethyleneimine, starch, gum arabi and methyl cellulose, as well as polymers derived from an aqueous dispersion media (emulsions) such as vinyl polyacetate, ethylene-vinyl acetate copolymer, polyester resin and polyurethane resin.

(Calculating the Peak Height Ratio (β/α))

Here, described below is a method of calculating the above-mentioned peak height ratio (β/α) of the surface-treatment coating. First, the surface-treatment coating is measured for its infrared absorption spectra over a wave number range of 4000 to 700 cm$^{-1}$ by a predetermined method. Absorption peaks due to the water vapor and the carbon dioxide are subtracted from the obtained infrared absorption spectra of the surface-treatment coating. Thereafter as shown in FIG. 1, there are obtained a maximum absorption peak height (α) in a wave number range of from 1660 to 1760 cm$^{-1}$ in the infrared absorption spectra and a maximum absorption peak height (β) in a wave number range of from 1490 to 1659 cm$^{-1}$, and from which a peak height ratio (β/α) is calculated. Here, the maximum absorption peak height (α) in the wave number range of from 1660 to 1760 cm$^{-1}$ in the infrared absorption spectra and the maximum absorption peak height (β) in the wave number range of from 1490 to 1659 cm$^{-1}$, are defined as described below.

Maximum peak height (α): A straight line connecting a point at where the absorbance becomes the smallest in a wave number range of 1800 to 2000 cm$^{-1}$ to a point at where the absorbance becomes the smallest in a wave number range of 1000 to 1200 cm$^{-1}$, is regarded to be a base line. A straight line is drawn from the vertex of the maximum absorption peak in the wave number range of 1660 to 1760 cm$^{-1}$ perpendicularly to the abscissa (wave number). A difference between the absorbance at a point where the straight line intersects the base line and the absorbance at the vertex of the maximum absorption peak is regarded to be a maximum peak height ($\alpha$).

Maximum peak height ($\beta$): A straight line connecting a point at where the absorbance becomes the smallest in a wave number range of 1800 to 2000 $cm^{-1}$ to a point at where the absorbance becomes the smallest in a wave number range of 1000 to 1200 $cm^{-1}$, is regarded to be a base line. A straight line is drawn from the vertex of the maximum absorption peak in the wave number range of 1490 to 1659 $cm^{-1}$ perpendicularly to the abscissa (wave number). A difference between the absorbance at a point where the straight line intersects the base line and the absorbance at the vertex of the maximum absorption peak is regarded to be a maximum peak height ($\beta$).

Further, the polycarboxylic acid type polymer used in the present invention would be a copolymer of an ethylenically unsaturated carboxylic acid and other ethylenically unsaturated carboxylic esters such as alkyl acrylate or alkyl methacrylate, or a mixture of the polymer of the ethylenically unsaturated carboxylic acid and the polymer of the unsaturated carboxylic ester. Or, further, the polycarboxylic acid type polymer used in the present invention can be a copolymer of an ethylenically unsaturated carboxylic acid and a vinyl carboxylate ester, or a mixture of the polymer of the ethylenically unsaturated carboxylic acid and the polymer of the vinyl carboxylate ester. In such cases, the C=O stretching vibration due to the ester bond (—COOR: R is an alkyl group) of the carboxylic acid ester gives an absorption peak that has an absorption maximum in a wave number range of 1730 $cm^{-1}$ to 1760 $cm^{-1}$. Strictly speaking, therefore, the maximum absorption peak in the wave number range of 1660 to 1760 $cm^{-1}$ in the infrared absorption spectra of the copolymer or the mixture thereof could include two kinds of C=O vibration due to the carboxyl group (—COOH) and the ester bond (—COO—R). In these cases, too, the peak height ratio ($\beta/\alpha$) calculated according to the above-mentioned procedure is used as a measure for representing the ratio of the amount of the free carboxyl groups (—COOH) forming no metal salt with zirconium and the amount of the carboxyl groups (—COO$^-$) forming a metal salt with zirconium. Even when the surface-treatment coating contains a compound or a polymer that has an ester bond in a range in which the object of the invention is not impaired, the peak height ratio ($\beta/\alpha$) calculated according to the above-mentioned procedure is used as a measure for representing the ratio of the amount of the free carboxyl groups (—COOH) forming no metal salt with zirconium and the amount of the carboxyl groups (—COO$^-$) forming a metal salt with zirconium.

When the surface-treatment coating partly contains metals other than zirconium, such as alkali metals like sodium and potassium or polyvalent metals like zinc and calcium (e.g., when the polycarboxylic acid type polymer is mixed with or contains metal salts other than zirconium), on the other hand, the C=O stretching vibration due to a metal salt (—COO$^-$) of a carboxyl group and a metal other than zirconium gives an absorption peak that has an absorption maximum near 1560 $cm^{-1}$ in a wave number range of 1490 $cm^{-1}$ to 1659 $cm^{-1}$. Strictly speaking, therefore, in the peak in the infrared absorption spectra, the C=O stretching vibration due to the metal salt of the carboxyl group and zirconium includes a C=O stretching vibration due to the metal salt of some carboxyl groups and a metal other than zirconium. In this case, too, the peak height ratio ($\beta/\alpha$) calculated according to the above-mentioned procedure is used as a measure for representing the ratio of the amount of the free carboxyl groups (—COOH) forming no metal salt with zirconium and the amount of the carboxyl groups (—COO$^-$) forming a metal salt with zirconium.

The infrared absorption spectra of the surface of the surface-treated metal sheet are preferably measured by a high sensitivity reflection method (reflection absorption method) that is capable of highly sensitively measuring the infrared absorption spectra of a thin film formed chiefly on a metal material. It is, further, desired to use a polarizer for the measurement. By using the polarizer, it is allowed to detect a parallel polarization (P-polarization) only and, therefore, to take measurement highly sensitively. Here, however, use of the polarizer causes a decrease in the quantity of infrared rays used for the measurement and hence causes an increase in noise. Therefore, the detector used for the measurement is, desirably, a semiconductor type mercury cadmium telluride (MCT) detector. Moreover, a gold-deposited mirror is desirably used as a reference substrate for measurement.

(Surface-Treating Solution)

The surface-treatment coating of the invention can be formed by using a surface-treating solution that contains a polycarboxylic acid type polymer, a zirconium compound and an aqueous medium.

It is desired that the surface-treating solution contains the zirconium compound in an amount calculated as zirconium of 7.4 to 74 parts by mass, preferably, 14 to 60 parts by mass, more preferably, 18 to 52 parts by mass, further preferably, 22 to 48 parts by mass and, particularly preferably, 29 to 48 parts by mass per 100 parts by mass of the solid component of the polycarboxylic acid type polymer (when the zirconium compound is the above-mentioned oxyzirconium salt, it is desired that the oxyzirconium salt is contained in an amount calculated as zirconium oxide ($ZrO_2$) of 10 to 100 parts by mass, preferably, 20 to 80 parts by mass, more preferably, 25 to 70 parts by mass, further preferably, 30 to 65 parts by mass and, particularly preferably, 40 to 65 parts by mass per 100 parts by mass of the polycarboxylic acid type polymer).

As the aqueous medium, there can be used water such as distilled water, ion-exchanged water or pure water. Like the conventional aqueous compositions, the aqueous medium can contain organic solvents such as alcohol, polyhydric alcohol and derivatives thereof. These cosolvents can be used in an amount of 5 to 30% by weight relative to water. Use of the solvent within the above-mentioned range helps improve properties of the film. As the organic solvent, there can be exemplified methyl alcohol, ethyl alcohol, isopropyl alcohol, propylene glycol monopropyl ether, ethylene glycol monobutyl ether, propylene glycol monomethyl ether, propylene glycol monobutyl ether, dipropylene glycol monomethyl ether, dipropylene glycol monobutyl ether, tripropylene glycol monomethyl ether and 3-methyl-3-methoxybutanol.

As required, the surface-treating solution may, further, contain such additives as a stabilizer, an antioxidant, a surface-adjusting agent, a defoaming agent and the like.

(Method of Forming the Surface-Treatment Coating on the Metal Sheet)

There is no particular limitation on the method of forming the surface-treatment coating on the metal sheet. For instance, the metal sheet is dewaxed so as to cleanse (pretreat) the surfaces thereof or to remove the rolling oil and the antirust oil, and is further washed with water or is adjusted for its surfaces. Thereafter, the surface-treating solution is applied onto the metal sheet followed by heating and drying thereby to form the surface-treatment coating thereon.

There is no particular limitation on the dewaxing treatment. For instance, there can be employed washing with an alkali or washing with an acid, that have heretofore been employed for dewaxing the metal sheets such as of aluminum and aluminum alloys. From the standpoint of close adhesion between the surface-treatment coating and the metal material in the invention, it is desired to execute the washing with an alkali and then the washing with an acid, or to execute the washing with an acid without executing the washing with an alkali. In the dewaxing treatment, the washing with an alkali is, usually, executed by using an alkaline cleaner and the washing with an acid is executed by using an acidic cleaner.

There is no particular limitation on the alkaline cleaner, and there can be used the one that has heretofore been used for the ordinary washing with an alkali, such as "Surf-Cleaner 420N-2" produced by NIPPONPAINT Co., Ltd. There is no particular limitation on the acidic cleaner, and there can be exemplified aqueous solutions of inorganic acids such as sulfuric acid, nitric acid and hydrochloric acid. After the dewaxing treatment has been executed, the washing with water is executed to remove the dewaxing agent remaining on the surface of the metal sheet. Thereafter, water is removed from the surface of the metal sheet by a method such as air-blowing or by hot air drying.

The surface-treating solution can be applied onto the metal sheet by a known method such as roll-coating method, spraying method, dipping method, brush-applying method, spray-wringing method (the surface-treating solution is applied by spray onto the metal sheet and, thereafter, the liquid film is wrung by using the roll or the air followed by drying), dip-wringing method (the metal sheet is dipped in the surface-treating solution and, thereafter, the liquid film is strongly wrung by using the roll or the air followed by drying). The dying conditions after the surface has been treated consist of 50 to 300° C. for 5 seconds to 5 minutes and, specifically, 50 to 250° C. for 10 seconds to 2 minutes.
(Polyester Coating)

In the surface-treated metal sheet of the invention, the polyester coating formed on the surface-treatment coating is a coating that contains a polyester resin, a phenol resin and an acid catalyst.
(Polyester Resin)

In the surface-treated metal sheet of the present invention, it is desired that the polyester resin for forming the polyester coating has a glass transition temperature (Tg) in a range of 15° C. to 80° C., preferably, 20° C. to 65° C. and, more preferably, 25° C. to 55° C. If Tg is higher than the above range, the coating that is formed becomes hard. Therefore, if the can body receives an external shock (dent), the coating tends to be easily cracked and the dent resistance deteriorates. If Tg is lower than the above range, on the other hand, the coating lacks heat resistance in a high-temperature environment such as during the sterilization treatment and, therefore, tends to easily undergo cohesive breakage. As a result, the organic resin film may often peel off and the hot water-resistant adhering property may deteriorate. Moreover, water-proof property and barrier property against corrosive components may decrease and hence the dent resistance may decrease.

In the invention, further, two or more kinds of polyester resins having different Tg may be blended together to form a coating. In this case, too, it is desired that Tg of the polyester resin blend calculated according to the following formula lies within the above-mentioned range of Tg.

$$1/Tg=(W_1/Tg_1)+(W_2/Tg_2)+ \ldots +(W_m/Tg_m)$$

$$W_1+W_2+ \ldots +W_m=1$$

In the above formula, Tg is a glass transition temperature (K) of the polyester resin blend, and $Tg_1$, $Tg_2$, ..., $Tg_m$ are glass transition temperatures (K) of the polyester resins that are used (polyester resin 1, polyester resin 2, ... polyester resin m). Further, $W_1$, $W_2$, ..., $W_m$ are weight percentages of the polyester resins (polyester resin 1, polyester resin 2, polyester resin m).

As the polyhydric carboxylic acid component for constituting the polyester resin, there can be exemplified aromatic dicarboxylic acids such as terephthalic acid, isophthalic acid, orthophthalic acid and naphthalenedicarboxylic acid; aliphatic dicarboxylic acids such as succinic acid, glutaric acid, adipic acid, azelaic acid, sebacic acid, dodecanedioic acid and dimeric acid; unsaturated dicarboxylic acids such as (anhydrous) maleic acid, fumaric acid and terpene-maleic acid adduct; alicyclic dicarboxylic acids such as 1,4-cyclohexanedicarboxylic acid, tetrahydrophthalic acid, hexahydroisophthalic acid and 1,2-cyclohexenedicarboxylic acid; and trivalent or more highly valent carboxylic acids such as (anhydrous) trimellitic acid, (anhydrous) pyromellitic acid and methylcyclohexanetricarboxylic acid, from which one or two or more of them are selected and used.

In the invention, the polyvalent carboxylic acid component that constitutes the polyester resin is constituted by chiefly the aromatic dicarboxylic acid and the aliphatic dicarboxylic acid having 6 to 14 carbon atoms, and it is desired to use the polyester resin in which their molar ratio is in a range of 95:5 to 80:20 and, specifically, 92:8 to 83:17. In this case, the coating acquires the strength, heat resistance, water-proof property and shock resistance which are well balanced, and, therefore, exhibits more excellent dent resistance and hot water-resistant adhering property. When the amount of the aliphatic dicarboxylic acid is smaller than the above-mentioned range, the coating has decreased shock resistance and deteriorated dent resistance as compared to the case where the amount thereof is within the above-mentioned range. On the other hand, when the amount of the aliphatic dicarboxylic acid is larger than the above range, the coating acquires decreased strength, decreased heat resistance and decreased water-proof property and, therefore, exhibits deteriorated hot water-resistant adhering property and dent resistance as compared to the case where the amount thereof is within the above-mentioned range.

As the aromatic dicarboxylic acid, there can be exemplified terephthalic acid, isophthalic acid, orthophthalic acid and naphthaenedicarboxylic acid. As the aliphatic dicarboxylic acid having 6 to 14 carbon atoms, there can be exemplified adipic acid, pimelic acid, suberic acid, azelaic acid, sebacic acid and dodecanoic diacid.

In the invention, in particular, the terephthalic acid and/or the isophthalic acid are, preferably, used as the aromatic dicarboxylic acid, and the sebacic acid is, preferably, used as the aliphatic dicarboxylic acid having 6 to 14 carbon atoms.

As the polyhydric alcohol component that constitutes the polyester resin, there is no particular limitation and there can be exemplified aliphatic glycols such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 2-ethyl-2-butyl-1,3-propanediol, 2,4-diethyl-1,5-pentanediol, 1-methyl-1,8- octanediol, 3-methyl-1,6-hexanediol, 4-methyl-1,7-heptanediol, 4-methyl-1,8-octanediol, 4-propyl-1,8-octanediol and 1,9-nonanediol; ether glycols such as diethylene glycol, triethylene glycol, polyethylene glycol, polypropylene glycol and polytetramethylene glycol; alicyclic polyalcohols such as 1,4-cyclohexanedimethanol, 1,3-cyclohexanedimethanol, 1,2-cyclohexanedimethanol, tricyclodecane glycols and hydrogenated bisphenols; and trivalent or more highly valent polyalcohols such as trimethylolpropane, trimethylolethane and pentaerythritol, and from which one kind or two or more kinds of them are used in combination.

In the invention, though not limited thereto, it is desired to use such diol components as ethylene glycol, propylene glycol, 1,4-butanediol and neopentyl glycol as polyhydric alcohol components. It is, further, desired that the 1,4-butanediol is contained in an amount of 10 to 50 mol % relative to the whole polyhydric alcohol components.

It is desired that the polyester resin has an acid value that lies in a range of 5 to 40 mgKOH/g and, specifically, 10 to 25 mgKOH/g though not limited thereto. When the acid value is smaller than the above range, the aqueous coating material is prepared with difficulty. When the acid value is larger than the above range, on the other hand, the coating easily absorbs water and exhibits deteriorated dent resistance as compared to the case where the acid value is within the above range.

As a method of imparting a desired acid value to the polyester resin, there can be exemplified a method of polymerizing the resin and, thereafter, adding thereto one or two or more kinds of acid anhydrides such as anhydrous trimellitic acid, anhydrous phthalic acid, anhydrous pyromellitic acid, anhydrous succinic acid, anhydrous 1,8-naphthalic acid, anhydrous 1,2-cyclohexanedicarboxylic acid, cyclohexane-1,2,3,4-tetracaboxylic acid-3,4 anhydride, ethylene glycol bisanhydrotrimellitate, 5-(2,5-dioxotetrahydro-3-furayl)-3-methyl-3-cyclohexene-1,2-dicarboxylic anhydride, and naphthalene 1,8:4,5-tetracarboxylic acid dianhydride, and conducting the depolymerization reaction in an inert atmosphere.

It is desired that the polyester resin has a number average molecular weight in a range of 5,000 to 25,000 though not limited thereto only. When the amount thereof is smaller than the above range, the hot water-resistant adhering property and the dent resistance may decrease. When the amount thereof is larger than the above range, on the other hand, the reactivity with the phenol resin which is a curing component decreases, and the coating may not be cured to a sufficient degree.

In the surface-treated metal sheet of the present invention, when the polyester coating that contains the polyester resin, phenol resin and acid catalyst is formed by using an aqueous coating composition that contains a water-soluble and/or a water-dispersible polyester resin, a phenol resin, an acid catalyst and an aqueous medium, it is desired that the water-soluble and/or the water-dispersible polyester resin is a polyester resin of which the carboxyl groups in the molecular chain are neutralized and hydrated with a basic compound. The polyester resin of which the carboxyl groups in the molecular chain are neutralized and hydrated with the basic compound is capable of forming a coating having a higher water-proof property and, therefore, more favorable dent resistance than those of a polyester resin of which polar groups other than the carboxylic acid groups, such as sulfonic acid groups or phosphoric acid groups are neutralized and hydrated with the basic compound.

As the basic substance used for neutralizing the carboxyl groups, there can be exemplified amine compounds and inorganic salts such as sodium hydroxide and potassium hydroxide. Desirably, however, a volatile amine compound is used so that the basic substance does not remain on the coating after the drying and printing. Concrete examples of the amine compound include alkylamines such as ammonia or trimethylamine, triethylamine and n-butylamine; alcohol amines such as 2-dimethylaminoethanol, diethanolamine, triethanolamine, aminomethylpropanol and dimethylaminomethylpropanol; polyvalent amines such as ethylenediamine and diethylenetriamine; amines having a branched-chain alkyl group, such as branched-chain alkylamines having 3 to 6 carbon atoms and, specifically, 3 to 4 carbon atoms, like isopropylamine sec-butylamine, tert-butylamine and isoamylamine; and heterocyclic amines such as saturated heterocyclic amines containing one nitrogen atom, like pyrrolidine, piperidine and morpholine. Among them, the 2-dimethylaminoethanol can be favorably used in an amount equivalent to the carboxyl groups.

(Phenol Resin)

The invention uses a phenol resin as a component for curing the polyester resin.

As the phenol resin, there can be used a resol type phenol resin obtained by using one or two or more kinds of phenol monomers such as o-cresol, p-cresol, p-tert-butylphenol, p-ethylphenol, 2,3-xylenol, 2,5-xylenol, phenol, m-cresol, m-ethylphenol, 3,5-xylenol and m-methoxyphenol in a mixture, and reacting these phenol monomers with a formaldehyde in the presence of an alkali catalyst.

In the invention, the phenol resin is desirably the one in which part or whole of the methylol groups contained therein are alkoxymethylated with alcohols having 1 to 12 carbon atoms. Particularly preferably, there is used the resol type phenol resin derived from the m-cresol and of which the methylol groups are alkoxymethylated with the n-butanol.

In the invention, it is desired that the phenol resin is contained in the coating in an amount in a range of 5 to 50 parts by mass and, specifically, 10 to 40 parts by mass per 100 parts by mass of the polyester resin.

When the content of the phenol resin is smaller than the above range, the curing is not effected to a sufficient degree. In a high-temperature environment during the step of sterilization treatment or the like, therefore, the coating lacks heat resistance and cohesive breakage takes place in the coating. As a result, the organic resin film may often peel off to deteriorate the hot water-resistant adhering property. When the content of the phenol resin is larger than the above range, on the other hand, the curing takes place excessively and the dent resistance may decrease due to a decreased shock resistance of the coating.

(Acid Catalyst)

The invention uses an acid catalyst as a curing catalyst to promote the crosslinking reaction of the polyester resin with the phenol resin, to realize more dense crosslinking at a low temperature in a short period of time and efficiently.

As the acid catalyst, there can be exemplified sulfuric acid, p-toluenesulfonic acid, dodecylbenzenesulfonic acid, naphthalenesulfonic acid, dinonylnaphthalenesulfonic acid, dinonylnaphhthalenedisulfonic acid, camphorsulfonic acid, phosphoric acid and amine-neutralized products thereof (those partly or wholly neutralized with an amine compound). Among them, one kind or two or more kinds of them can be used in combination. Among these acid catalysts, particularly preferred are the organic sulfonic acid compounds such as dodecylbenzenesulfonic acid, p-toluenesulfonic acid and camphorsulfonic acid, and amine-neutralized products thereof.

It is desired that the acid catalyst is contained in an amount in a range of 0.1 to 5 parts by mass and, specifically, 0.5 to 3 parts by mass per 100 parts by mass of the polyester resin. When the content of the acid catalyst is smaller than the above range, the effect may not be sufficient for promoting the curing reaction. When the content of the acid catalyst is larger than the above range, on the other hand, the coating may exhibit decreased water-proof property and deteriorated dent resistance.

The polyester coating can be formed on the metal sheet of the invention by applying, on the metal sheet, a coating composition that contains the polyester resin, phenol resin and acid catalyst. Here, as described above, it is desired that the coating composition is an aqueous coating composition that contains the water-soluble and/or water-dispersible polyester resin, phenol resin, acid catalyst and aqueous medium.

The aqueous medium can be the same as the aqueous medium used for the surface-treating solution mentioned above.

The aqueous coating composition can be applied onto the surface-treated metal sheet by a conventional method such as roll-coating method, spraying method, dipping method or brush-application method. The polyester coating is baked under the conditions of, desirably, 100 to 300° C. for 5 seconds to 5 minutes and, preferably, 200 to 280° C. for 10 seconds to 3 minutes.

Further, though not limited thereto only, the polyester coating has a thickness in a range of 0.1 to 10 µm and, specifically, 0.3 to 3 µm in terms of dry thickness. When the thickness of the polyester coating is smaller than the above range, a desired dent resistance may not be obtained. On the other hand, even when the thickness thereof is larger than the above range, no further improved properties can be expected but to disadvantage in economy.

(Metal Sheet)

There is no particular limitation on the metal sheet used in the invention, and there can be used various kinds of steel sheets and aluminum sheets. As the steel sheets, there can be used the one obtained by annealing a cold-rolled steel sheet followed by the secondary cold rolling. There can be, further, used clad steel sheets. As the aluminum sheet, there can be used those comprising the so-called pure aluminum as well as those comprising aluminum alloys. The invention, particularly preferably, uses an aluminum sheet comprising an aluminum alloy. As the aluminum sheet, there are favorably used 5182 aluminum alloy, 5021 aluminum alloy, 5022 aluminum alloy, 5052 aluminum alloy, 3004 aluminum alloy, 3005 aluminum alloy, 3104 aluminum alloy, 1100 aluminum alloy and the like.

There is no limitation on the initial thickness of the metal sheet and the thickness may vary depending on the kind of the metal, use of the container or the size thereof. Generally, however, the metal sheet should have a thickness of 0.10 to 0.50 mm. In the case of a steel sheet, the thickness should be 0.10 to 0.30 mm while in the case of an aluminum sheet, the thickness should be 0.15 to 0.40 mm. This is because if the thickness is less than 0.15 mm, it becomes difficult to form the lids and a desired lid strength cannot be obtained. On the other hand, the thickness in excess of 0.40 mm becomes disadvantageous in economy.

The invention can use the metal sheet that has been subjected to the surface treatment such as conversion treatment or plating in a customary manner.

When a steel sheet is used as the metal sheet, the surface treatment may comprise one kind or two or more kinds of surface treatments, such as zinc plating, tin plating, nickel plating, electrolytic chromate treatment, chromate treatment and phosphate treatment. When an aluminum sheet is used as the metal sheet, there can be exemplified inorganic conversion treatments such as chromium phosphate treatment, zirconium phosphate treatment and phosphate treatment, as well as organic/inorganic composite conversion treatment which is a combination of the inorganic conversion treatment with a water-soluble resin such as acrylic resin or phenol resin, or an organic component such as tannic acid.

(Organic Resin Film)

In the organic resin-covered surface-treated metal sheet of the present invention, there is no particular limitation on the organic resin that constitutes the organic resin film formed via the surface-treatment coating and the polyester coating. Namely, examples of the organic resin are thermoplastic resins, i.e., polyolefins such as crystalline polypropylene, crystalline propylene-ethylene copolymer, crystalline polybutene-1, crystalline poly 4-methylpentene-1, low-, intermediate- or high-density polyethylene, ethylene-vinyl acetate copolymer (EVA), ethylene-ethyl acrylate copolymer (EEA), ionically crosslinked olefin copolymer (ionomer); aromatic vinyl copolymers such as polystyrene and styrene-butadiene copolymer; halogenated vinyl polymers such as polyvinyl chloride and vinylidene chloride; nitrile polymers such as acrylonitrile-styrene copolymer and acrylonitrile-styrene-butadiene copolymer; polyamides such as nylon 6, nylon 66, para- or meta-xylene adipamide; polyesters such as polyethylene terephthalate (PET) and polytetramethylene terephthalate; various polycarbonates; and polyacetals such as polyoxymethylene and the like. A thermoplastic resin film constituted by any of these thermoplastic resins can be used as the organic resin film. Among them, a polyester resin film constituted by the polyester resin as the thermoplastic resin can be particularly favorably used.

The polyester resin that constitutes the polyester resin film may be a homopolyethylene terephthalate or a copolymerizable polyester monomer that contains acid components other than the terephthalic acid in amounts of not more than 30 mol % on the basis of acid components or contains alcohol components other than the ethylene glycol in amounts of not more than 30 mol % on the basis of alcohol components, or may be a blend thereof.

As the acid components other than the terephthalic acid, there can be exemplified isophthalic acid, naphthalenedicarboxylic acid, cyclohexanedicarboxylic acid, P-β-oxyethoxybenzoic acid, diphenoxyethane-4,4'-dicarboxylic acid, 5-sodiumsulfoisophthalic acid, hexahydroterephthalic acid, succinic acid, adipic acid, sebacic acid, dodecanedioic acid, dimeric acid, trimellitic acid, and pyromellitic acid.

As the alcohol components other than the ethylene glycol, there can be exemplified glycol components such as propylene glycol, 1,4-butanediol, neopentyl glycol, 1,6-hexylene glycol, diethylene glycol, triethylene glycol, cyclohexanedimethanol, ethylene oxide adduct of bisphenol A, trimethylolpropane and pentaerythritol.

Further, the polyester resin may be a resin blended with a homopolyethylene terephthalate resin and/or a copolymerized polyester resin comprising chiefly a polyethylene terephthalate and a crystalline polyester resin other than the above, such as a homopolybutylene terephthalate resin and/or a copolymerized polyester resin comprising chiefly a polybutylene terephthalate resin. Or the polyester resin may be a resin blended with the homopolyethylene naphthalate resin and/or a copolymerized polyester resin comprising chiefly a polyethylene naphthalate resin. In this case, it is desired that crystalline polyester resin is used in an amount of 5 to 50% by weight relative to the homopolyethylene terephthalate resin and/or the copolymerized polyester resin chiefly comprising the polyethylene terephthalate resin. Here, the crystalline polyester resin is other than the homopolyethylene terephthalate resin or the copolymerized polyester resin chiefly comprising the polyethylene terephthalate resin.

Among the above polyester resins, it is desired to use any of a polyethylene terephthalate resin comprising an ethylene terephthalate unit, a polyethylene terephthalate/polyethylene isophthalate copolymer resin, a polyethylene terephthalate/polybutylene terephthalate copolymer resin, a polyethylene terephthalate/polyethylene naphthalate copolymer resin, a resin of a blend of a polyethylene terephthalate resin and a polybutylene terephthalate resin, or a resin of a blend of a polyethylene terephthalate/polyethylene isophthalate copolymer resin and a polybutylene terephthalate resin. Specifically, it is desired to use a polyethylene terephthalate/polyethylene isophthalate copolymer resin or a resin of a blend of the polyethylene terephthalate/polyethylene isophthalate copolymer resin and the polybutylene terephthalate resin. It is desired that the polyethylene terephthalate/polyethylene isophthalate copolymer resin contains the isophthalic acid in an amount of not more than 20 mol % (on the basis of acid components). The resin of a blend of the polyethylene terephthalate/polyethylene isophthalate copolymer resin and the polybutylene terephthalate resin contains the polybutylene terephthalate resin, desirably, in an amount in a range of 10 to 50% by weight relative to the polyethylene terephthalate/polyethylene isophthalate copolymer resin.

The polyester resin used as the organic resin film should have a molecular weight in a range to allow formation of a film and an intrinsic viscosity [η] of not less than 0.5 and, specifically, in a range of 0.52 to 0.70 as measured by using, as a solvent, a phenol/tetrachloroethane mixed solvent from the standpoint of barrier property against corrosive components and mechanical properties. The polyester resin should, further, have a glass transition point of not lower than 50° C. and, specifically, in a range of 60° C. to 80° C.

The thermoplastic resin film such as the polyester resin film can be blended with a blending agent for films, lubricating agent, anti-blocking agent, pigment, various antistatic agents and antioxidant that have been known per se according to a known recipe.

Usually, the thermoplastic resin film such as polyester resin film has a thickness which is, preferably, in a range of 5 to 40 μm.

The organic resin film which is the thermoplastic resin film can be formed in a two-layer constitution. When the polyester resin is used as the thermoplastic resin, the lower layer should be formed of a polyester resin that chiefly comprises the ethylene terephthalate unit and contains at least one of the isophthalic acid or naphthalenedicarboxylic acid in an amount of 1 to 30 mol % (on the basis of acid components), the amount of the acid components being larger than the amount of the acid components in the polyester resin forming the upper layer. This is particularly desirable from the standpoint of maintaining adhering property during the working and dent resistance.

(Method of Forming the Organic Resin Film on the Surface-Treated Metal Sheet)

As for the method of forming the organic resin film on the surface-treated metal sheet, when the organic resin film is the thermoplastic resin film, there can be favorably employed, for example, a method of forming the thermoplastic resin film in advance by a known method and coating the surface-treated metal sheet with the thermoplastic resin film by a heat-adhesion method or an extrusion lamination method by which a heated and melted thermoplastic resin is extruded into a film by using an extruder and the surface-treated metal sheet is directly coated with the film. Further, when the thermoplastic resin film is formed and is, thereafter, applied, the film may have been stretched but, desirably, should not have been stretched from the standpoint of forming workability and dent resistance.

Figure 2:
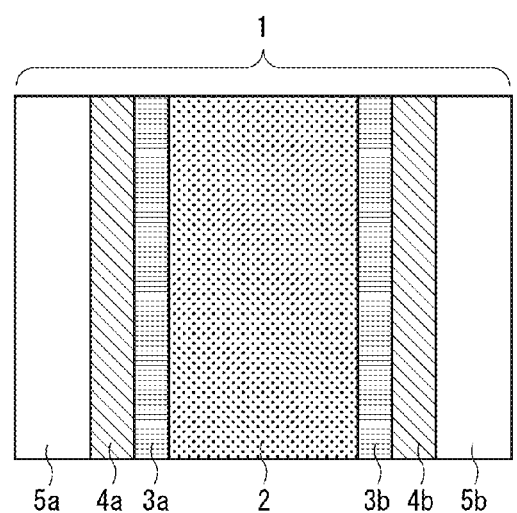
FIG. 2 It is a view illustrating a sectional structure of an organic resin-covered surface-treated metal sheet of the present invention.

FIG. 2 shows, as a concrete embodiment, a sectional structure of an organic resin-covered surface-treated metal sheet obtained by forming the organic resin film on the surface-treated metal sheet of the present invention. The organic resin-covered surface-treated metal sheet 1 has surface-treatment coatings 3a and 3b formed on both the inner surface and the outer surface of a metal sheet 2, and organic resin films 5a and 5b formed via polyester coatings 4a and 4b. Here, in the organic resin-covered surface-treated metal sheet of the invention, it is sufficient if the surface-treatment coating, polyester coating and organic resin film are formed on at least the surface that becomes the inner surface of the can body or the can lid.

When the can lid is to be formed by using the surface-treated metal sheet of the invention, it is sufficient if the can lid is formed by using the surface-treated metal sheet on which the surface-treatment coating and the polyester coating are formed without, however, forming the organic resin film.

(Can Body and Method of its Production)

The can body can be produced by using the organic resin-covered surface-treated metal sheet of the invention relying on a known forming method.

The organic resin-covered surface-treated metal sheet of the invention maintains excellent and adhering property during the working, and can be formed into a seamless can through a severe working such as draw working, draw-deep draw working, draw-ironing working, or draw-bend elongation-ironing working without permitting can wall to be broken or without permitting the organic resin film to be peeled off at the flange-forming portion.

It is desired that, by subjecting the organic resin-covered surface-treated metal sheet to the bend elongation or further to the ironing based on the draw-redraw working, the thickness of the side wall of the seamless can is reduced to 20 to 95% and, specifically, 25 to 85% of the initial thickness of the organic resin-covered surface-treated metal sheet.

The obtained seamless can is subjected to the heat treatment (heat set) of at least one stage to remove residual strain caused by the working from the organic resin film (thermoplastic resin film), to volatilize the lubricant used for the working from the surface and, further, to dry and cure the ink printed on the surface. After the heat treatment, the container is quenched or is left to cool and, as required, is subjected to the necking of one stage or a multiplicity of stages followed by flanging to obtain a can for wrap-seaming.

(Can Lid and Method of its Production)

The can lids can be produced by using the surface-treated metal sheet and the organic resin-covered surface-treated metal sheet of the invention based on a conventional method of forming the can lids but forming the polyester coating and the organic resin film on the inner surface of the can lids.

The can lid is allowed to assume any known shapes such as an easy-to-open end and the like having a score for forming an opening for pouring out the content and a tab for unsealing.

EXAMPLES

The present invention will now be described in detail by way of concrete Examples to which only, however, the invention is in no way limited. In the following description, "parts" are all "by mass".

(Synthesis of the Polyester Resin and Preparation of the Aqueous Dispersion Solution)

Into a reaction vessel equipped with a stirrer, a heater, a thermometer and a partly refluxing cooler, there were suitably fed polyvalent carboxylic acids, polyvalent carboxylic acid esters, polyhydric alcohols and a catalyst which are the starting materials. The reaction was carried out at a reaction temperature of 210 to 250° C., under a reduced pressure of not higher than 2 mmHg and a reaction time of 4 to 6 hours to synthesize polyester resins A to L shown in Table 1. The compositions of the obtained polyester resins A to L, glass transition temperatures (Tg) and acid values were measured by the methods described later.

100 Parts of a methyl ethyl ketone was added to 100 parts of the synthesized polyester resin, and the mixture thereof was stirred at 80° C. for one hour to dissolve the polyester resin. Four parts of a 2-dimethylaminoethanol and 10 parts of a 2-propanol were then added thereto, and 250 parts of the ion-exchanged water was gradually added thereto with stirring so that the polyester resin was dispersed in water. Next, by using an evaporator, distillation was carried out under reduced pressure to distill off the solvent followed by filtration to prepare an aqueous solution in which the polyester resin was dispersed in an amount of about 30% as the solid component.

(Composition of the Polyester Resin)

The composition of the synthesized polyester resin was found by dissolving the resin dried in vacuum in the heavy chloroform and by taking a measurement relying on the $^1$H-NMR. The results are as shown in Table 1.

Instrument used: JNM-ECA400 manufactured by JEOL Ltd.

(Glass Transition Temperature (Tg) of the Polyester Resin)

The glass transition temperature of the synthesized polyester resin was found by using a differential scanning calorimeter (DSC). The measuring condition consisted of elevating the temperature at a rate of 10° C./10 min. The results are as shown in Table 1.

Instrument used: EXSTAR600 manufactured by Seiko Instruments Inc.

(Acid Value of the Polyester Resin)

The acid value of the synthesized polyester resin was found by a method specified under the JIS K0070. Namely, 0.2 g of the sample was accurately weighed and was dissolved in 20 ml of chloroform followed by the titration with 0.01N potassium hydroxide (ethanol solution). A phenolphthalein was used as the indicator. The results are as shown in Table 1.

(Number Average Molecular Weight)

The number average molecular weight of the synthesized polyester resin was measured based on a gel permeation chromatography (GPC) by using the polystyrene standard sample as a reference. The solvent was a tetrahydrofuran. The results are as shown in Table 1.

(Synthesis of the Phenol Resin)

Into a reaction vessel equipped with a stirrer, a heater, a thermometer and a partly refluxing cooler, there were added 100 parts of an m-cresol, 180 parts of an aqueous solution containing 37% by mass of formalin, and a suitable amount of sodium hydroxide as a catalyst. The mixture was reacted at 60° C. for 3 hours followed by dehydration under reduced pressure at 50° C. Next, 100 parts of an n-butanol and a suitable amount of phosphoric acid as a catalyst were added thereto, and the reaction was carried out at 110° C. for 4 hours. After completion of the reaction, the obtained solution was refined to obtain an m-cresol resol type phenol resin of which 50% of the solid component of methylol groups has been alkoxymethylated with the n-butanol.

Examples 1 to 36

[Preparation of the Surface-Treating Solution]

A polycarboxylic acid type polymer was dissolved in the ion-exchanged water to obtain an aqueous solution containing 2% by mass of the polycarboxylic acid type polymer. To the thus obtained aqueous solution of the polycarboxylic acid type polymer, there was added an aqueous solution of a zirconium compound so as to attain a predetermined blending ratio of the solid component thereof. The aqueous solution of the zirconium compound was adjusted with the ion-exchanged water to be 2% by mass, and was then added to the aqueous solution of the polycarboxylic acid type polymer. Next, the ion-exchanged water was added thereto such that the solid component concentration of the polycarboxylic acid type polymer in the aqueous solution was 0.5 to 1% by mass, and the surface-treating solution was thus obtained.

As the polycarboxylic acid type polymer, there were used polyacrylic acids ("JURYMER AC-10LP, Mw=25,000" produced by TOAGOSEI Co., Ltd.: described as "PAA1" in Table, "JURYMER AC-10LHP, Mw=250,000": described as "PAA2" in Table, "JURYMER AC-10P, Mw=5,000": described as "PAA3" in Table), a polymethacrylic acid ("Polymethacrylic acid, Mw=100,000" manufactured by Wako Pure Chemical Industries, Ltd.: described as "PMA" in Table) and a polyitaconic acid ("PIA-728, Mw=3,000" manufactured by IWATA CHEMICAL CO., LTD.: described as "PIA" in Table).

As the zirconium compound, there was used an ammonium zirconium carbonate ("Zircosol AC-7, content calculated as $ZrO_2$=13% by mass" manufactured by Daiichi Kigenso Kagaku Kogyo Co., Ltd.). Table 2 shows the amounts of the polycarboxylic acid type polymers used in Examples, amounts of the solid component of the zirconium compound calculated as the zirconium oxide ($ZrO_2$) and the amounts of the zirconium compound calculated as zirconium per 100 parts of the solid component of the polycarboxylic acid type polymer in the surface-treating solution.

[Preparation of the Aqueous Coating Composition]

There was prepared an aqueous coating composition containing about 5% of the solid component by using 333 parts of an aqueous dispersion solution of the synthesized polyester resin (100 parts of the solid component) shown in Table 1, an n-butanol solution of the above phenol resin (predetermined amount), an amine-neutralized product of a dodecylbenzenesulfonic acid (predetermined amount), 400 parts of a 2-propanol and 1500 to 2000 parts of the ion-exchanged water. As the amine-neutralized product of the dodecylbenzenesulfonic acid, there was used the one obtained by neutralizing the "Dodecylbenzenesulfonic acid (soft type)" manufactured by Tokyo Chemical Industry Co., Ltd. with a triethylamine. Table 2 shows the kinds of the polyester resins used in Examples, amounts of the solid components of the phenol resin and the acid catalyst (dodecylbenzenesulfonic acid) per 100 parts of the solid component of the polyester resin in the aqueous coating composition.

[Preparation of the Surface-Treated Metal Sheet]

The surface-treated metal sheet was prepared by forming the surface-treatment coating and the polyester coating on the metal sheet by methods described below.

[Forming the Surface-Treatment Coating]

An aluminum sheet (in the case of a can body, 3104 alloy sheet, thickness: 0.28 mm, sheet size: 200×300 mm) was used as the metal sheet. First, the metal sheet was washed with an alkali by dipping it in an aqueous solution (60° C.) of 2% of an alkaline cleaner "SurfCleaner 420N-2" (trade name) produced by NIPPONPAINT Co., Ltd. for 6 seconds. After the washing with alkali, the metal sheet was washed with water and then with an acid by dipping in an aqueous solution (60° C.) of 2% of sulfuric acid followed then by washing with water and drying. By using a wire bar coater, the surface-treating solution prepared above was applied onto the surface of the metal sheet that would become the inner surface of the can. The metal sheet was held in an oven set at 150° C. for 60 seconds so as to be dried and thereby to form the surface-treatment coating thereon.

[Forming the Polyester Coating]

After forming the surface-treatment coating as described above, the above-mentioned aqueous coating material was applied, by using the wire bar coater, onto the surface of the metal sheet having the surface-treatment coating formed thereon and was baked at 250° C. for 30 seconds to form a polyester coating and thereby to prepare a surface-treated metal sheet. Table 2 shows the thicknesses of the polyester coatings formed in Examples.

[Measuring the Coating Contents]

The contents of carbon due to the polycarboxylic acid in the surface-treatment coatings in Examples and the contents of zirconium due to the zirconium compounds were measured by using the metal sheets having only the surface-treatment coating formed thereon and by using an X-ray fluorometric analyzer as described in the above paragraph of "Forming the surface-treatment coating". In the measurement, first, a plurality of samples whose carbon or zirconium contents are known but different from each other were measured. Depending upon the intensities thereof, a calibration curve of intensity vs. content was drawn. The surface-treated metal sheets of Examples were measured under the same conditions. The measured intensities were converted into the contents based on the calibration curve, and the contents of carbon and zirconium in the surface-treatment coatings were thus measured. Table 2 shows the measured results of the contents of carbon (C) and zirconium (Zr).

Instrument used: ZSX100e manufactured by Rigaku Corporation

Measuring conditions: measuring diameter, 20 mm

X-ray output, 50 kV-70 mA

Instrument used: ZSX100e manufactured by Rigaku Corporation

[Calculating the Peak Height Ratio ($\beta/\alpha$)]

The peak height ratios ($\beta/\alpha$) of the surface-treatment coatings in Examples were found by a method described below by using the metal sheets forming the surface-treatment coatings only as described in the above paragraph of "Forming the surface-treatment coating".

The metal sheet was cut into a size of 8 cm×6 cm to be used as a sample for measurement. The sample was measured for its infrared absorption spectra on the surface thereof (on the surface on which the surface-treatment coating has been formed) Absorption peaks of the water vapor and the carbon dioxide were subtracted from the infrared absorption spectra of the surface-treatment coating. From the resultant infrared absorption spectra, a peak height ratio ($\beta/\alpha$) of the surface-treatment coating was calculated according to the method described in the above paragraph "Calculating the peak height ratio ($\beta/\alpha$)". From the obtained peak height ratio ($\beta/\alpha$), further, a crosslinking ratio was calculated according to the above-mentioned formula (1) described in the paragraph "Surface-treatment coating". Table 2 shows the measured results of peak height ratios ($\beta/\alpha$) and crosslinking ratios.

Instruments used: FTS 7000 Series manufactured by Digilab Inc.

Detector used: MCT detector

Accessory used: Advanced Grazing Angle (AGA) manufactured by PIKE Technologies

Measuring method: High-sensitivity reflection method (angle of incidence: 80 degrees, cumulative number of times: 100 times, reference substrate: gold-deposited mirror)

[Preparation of the Organic Resin-Covered Surface-Treated Metal Sheet]

The obtained surface-treated metal sheet was heated in advance at a sheet temperature of 250° C. Onto both surfaces of the surface-treated metal sheet, there were thermally press-adhered, as an organic resin film, a polyester resin film of a two-layer structure comprising a lower layer of polyethylene terephthalate containing 15 mol % of isophthalic acid and having a thickness of 8 µm and an upper layer of polyethylene terephthalate containing 2 mol % of isophthalic acid and having a thickness of 8 µm via laminate rolls followed immediately by cooling with water thereby to obtain an organic resin-covered metal sheet.

[Preparation of the Seamless Can]

Paraffin wax was electrostatically applied onto both surfaces of the obtained organic resin-covered surface-treated metal sheet, and then, the sheet was punched into a circle of a diameter of 156 mm to form a shallowly drawn cup. Next, the shallowly drawn cup was subjected to the redraw-ironing working, to the doming and to the trimming at the opening edge portion. The cup was heat-treated at 201° C. for 75 seconds and then at 210° C. for 80 seconds. The opening end was subjected to the necking and flanging to prepare a seamless can having a can wall of 211-diameter, a neck of 206-diameter and a capacity of 500 ml. The seamless can possessed the following specifications.

Can body diameter: 66 mm

Can body height: 168 mm

Average sheet thickness reduction ratio of the can wall to the initial sheet thickness: 60%

Comparative Example 1

An organic resin-covered surface-treated metal sheet was prepared by forming the surface-treatment coating thereon in the same manner as described in the above paragraph of "Forming the surface-treating layer" and, thereafter, in the same manner as described in the above paragraph of "Preparation of the organic resin-covered surface-treated metal sheet" but without forming the polyester coating. Thereby, a seamless can was prepared in the same manner as described in the above paragraph of "Preparation of the seamless can".

Comparative Example 2

The procedure was carried out up to the step of washing with an acid in the same manner as described in the above paragraph of "Forming the surface-treatment coating", followed by washing with water and drying. Thereafter, the polyester coating was formed on the surface of the metal sheet that becomes the inner surface of the can without, however, forming the surface-treatment coating. Then an organic resin-covered surface-treated metal sheet was prepared in the same manner as described in the above paragraph of "Preparation of the organic resin-covered surface-treated metal sheet. Thereby, a seamless can was prepared in the same manner as described in the above paragraph of "Preparation of the seamless can".

Comparative Example 3

A seamless can was prepared in the same manner as in Example 1 but using a surface-treating solution that contained no zirconium compound as shown in Table 2.

Comparative Example 4

A seamless can was prepared in the same manner as in Example 1 but using an aqueous coating composition that contained no phenol resin as shown in Table 2.

Comparative Example 5

A seamless can was prepared in the same manner as in Example 1 but using an aqueous coating composition that contained no acid catalyst as shown in Table 2.

Comparative Example 6

An organic resin-covered surface-treated metal sheet was prepared by using, as the metal sheet, an aluminum sheet treated with chromium phosphate on its surfaces (3104 alloy sheet, sheet thickness: 0.28 mm, sheet size: 200×300 m, chromium content in the surface-treatment coating: 20 mg/m$^2$) in the same manner as described in the above paragraph of "Preparation of the organic resin-covered surface-treated metal sheet". Thereby, a seamless can was prepared in the same manner as described in the above paragraph of "Preparation of the seamless can".

(Evaluating the Hot Water-Resistant Adhering Property)

The hot water-resistant adhering property was evaluated by preparing a seamless can in the same manner as described in the above paragraph of "Preparation of the seamless can", and scratching the inner surface of the minimum diameter portion at the neck portion along the circumference of the can by using a cutter knife deep enough to reach the metal surface. In this state, the can was dipped in hot water of 100° C. for 10 minutes, and the peeling state of the organic resin film at the neck portion was observed and evaluated. Table 2 shows the results of evaluation.

⊚: No peeling was recognized over the whole circumference of the can.
○: The length of the peeling portion was less than 10% of the whole circumferential length of the can.
Δ: The length of the peeling portion was not less than 10% but was less than 30% of the whole circumferential length of the can.
X: The length of the peeling portion was not less than 30% of the whole circumferential length of the can.

(Evaluating the Dent Resistance)

The dent resistance was evaluated as described below. Namely, the seamless can was prepared in the same manner as described in the paragraph of "Preparation of the seamless can". Thereafter, the obtained seamless can was filled with 500 g of an acidic model solution containing salt, and was wrap-seamed with a lid in a customary manner. Thereafter, the can was left to stand still sideways. A one-kilogram metal weight having a spherical shape 66 mm in diameter was dropped vertically from a height of 60 mm on the lower surface of the side wall of the can at room temperature such that the side wall was dented. After stored at 37° C. for 10 days in a state where the lid was facing upward, the dented portion on the inner surface side of the can was observed with the eye for its corroded state, and the dent resistance was evaluated.

The model solution used for the test contained salt in an amount of 0.2% and citric acid in such an amount that the pH thereof was adjusted to be 2.5.

⊚: No corrosion was recognized in the dented portion.
○: Almost no corrosion was recognized in the dented portion.
Δ: Corrosion was partly recognized in the dented portion.
X: Corrosion was recognized on the whole surface of dented portion.

TABLE 1

| | | Dicarboxylic acid components (molar ratio) | | | |
|---|---|---|---|---|---|
| | | Aromatic dicarboxylic acid | | Aliphatic dicarboxylic acid | |
| | | Terephthalic acid | Isophthalic acid | Sebacic acid | Adipic acid |
| Synthesis Ex. 1 | polyester resin A | 78 | 11 | 11 | |
| Synthesis Ex. 2 | polyester resin B | 71 | 14 | 15 | |
| Synthesis Ex. 3 | polyester resin C | 85 | 7 | 8 | |
| Synthesis Ex. 4 | polyester resin D | 68 | 15 | 17 | |
| Synthesis Ex. 5 | polyester resin E | 90 | 5 | 5 | |
| Synthesis Ex. 6 | polyester resin F | 76 | 9 | 15 | |
| Synthesis Ex. 7 | polyester resin G | 73 | 10 | 17 | |
| Synthesis Ex. 8 | polyester resin H | 68 | 12 | 20 | |
| Synthesis Ex. 9 | polyester resin I | 55 | 31 | | 14 |
| Synthesis Ex. 10 | polyester resin J | 62 | 14 | 24 | |
| Synthesis Ex. 11 | polyester resin K | 94 | 3 | 3 | |
| Synthesis Ex. 12 | polyester resin L | 100 | | | |

TABLE 1-continued

| | Diol components (molar ratio) | | | | | Tg (° C.) | Acid value (KOH mg/g) | Number average molecular weight |
|---|---|---|---|---|---|---|---|---|
| | Ethylene glycol | Propylene glycol | 1,4-Butane diol | Neopentyl glycol | * | | | |
| Synthesis Ex. 1 | 15 | 55 | 30 | | 88:12 | 41 | 18 | 11000 |
| Synthesis Ex. 2 | 13 | 47 | 40 | | 85:15 | 29 | 17 | 11600 |
| Synthesis Ex. 3 | 18 | 62 | 20 | | 92:8 | 52 | 19 | 9800 |
| Synthesis Ex. 4 | 12 | 43 | 45 | | 83:17 | 23 | 16 | 13000 |
| Synthesis Ex. 5 | 18 | 68 | 14 | | 95:5 | 60 | 19 | 9500 |
| Synthesis Ex. 6 | 44 | 32 | | 24 | 85:15 | 41 | 13 | 12200 |
| Synthesis Ex. 7 | 48 | 24 | | 28 | 83:17 | 34 | 12 | 12900 |
| Synthesis Ex. 8 | 52 | 15 | | 33 | 80:20 | 30 | 10 | 13600 |
| Synthesis Ex. 9 | 50 | | | 50 | 86:14 | 40 | 15 | 9000 |
| Synthesis Ex. 10 | 60 | | | 40 | 76:24 | 18 | 7 | 15000 |
| Synthesis Ex. 11 | 21 | 70 | | 9 | 97:3 | 68 | 20 | 8500 |
| Synthesis Ex. 12 | 22 | 78 | | | 100:0 | 80 | 21 | 8000 |

* Molar ratio of aromatic dicarboxylic acid:aliphatic dicarboxylic acid

TABLE 2

| | Composition of surface-treating solution | | | | | | |
|---|---|---|---|---|---|---|---|
| | Polycaboxylic acid polymer | | Zirconium compound | | coating contents (mg/m$^2$) | | Peak height ratio (β/α) | Crosslinking ratio (%) |
| | Kind | Amount of solid component (parts) | Amount of solid component (parts) | Amount calculated as zirconium (parts) | C | Zr | | |
| Ex. 1 | PAA1 | 100 | 10 | 7.4 | 33 | 4 | 0.20 | 17 |
| Ex. 2 | PAA1 | 100 | 20 | 14.8 | 35 | 7 | 0.35 | 26 |
| Ex. 3 | PAA1 | 100 | 25 | 18.5 | 37 | 10 | 0.45 | 31 |
| Ex. 4 | PAA1 | 100 | 30 | 22.2 | 38 | 12 | 0.60 | 38 |
| Ex. 5 | PAA1 | 100 | 40 | 29.6 | 39 | 16 | 0.75 | 43 |
| Ex. 6 | PAA1 | 100 | 50 | 37 | 34 | 17 | 1.00 | 50 |
| Ex. 7 | PAA1 | 100 | 65 | 48 | 34 | 21 | 1.48 | 60 |
| Ex. 8 | PAA1 | 100 | 70 | 51.8 | 35 | 23 | 1.60 | 62 |
| Ex. 9 | PAA1 | 100 | 80 | 59.2 | 36 | 27 | 1.94 | 66 |
| Ex. 10 | PAA1 | 100 | 100 | 74 | 36 | 32 | 2.54 | 72 |
| Ex. 11 | PAA2 | 100 | 50 | 37 | 34 | 17 | 0.96 | 49 |
| Ex. 12 | PAA3 | 100 | 50 | 37 | 33 | 17 | 1.01 | 50 |
| Ex. 13 | PMA | 100 | 50 | 37 | 35 | 22 | 0.86 | 46 |
| Ex. 14 | PIA | 100 | 50 | 37 | 32 | 23 | 1.14 | 53 |
| Ex. 15 | PAA1 | 100 | 50 | 37 | 85 | 41 | 0.92 | 48 |
| Ex. 16 | PAA1 | 100 | 50 | 37 | 21 | 10 | 1.04 | 51 |
| Ex. 17 | PAA1 | 100 | 50 | 37 | 12 | 6 | 0.98 | 50 |
| Ex. 18 | PAA1 | 100 | 50 | 37 | 10 | 5 | 1.03 | 51 |
| Ex. 19 | PAA1 | 100 | 50 | 37 | 34 | 17 | 1.00 | 50 |
| Ex. 20 | PAA1 | 100 | 50 | 37 | 34 | 17 | 1.00 | 50 |
| Ex. 21 | PAA1 | 100 | 50 | 37 | 34 | 17 | 1.00 | 50 |

| | Composition of the aqueous coating material | | | | Results of evaluation | |
|---|---|---|---|---|---|---|
| | Polyester resin | Phenol resin | Acid catalyst | Coating thickness (μm) | Hot water-resistant adhering property | Dent resistance |
| | Kind | Amount of solid component (parts) | Amount of solid component (parts) | Amount of solid component (parts) | | | |
| Ex. 1 | *A | 100 | 20 | 1 | 0.7 | Δ | Δ |
| Ex. 2 | *A | 100 | 20 | 1 | 0.7 | ○ | Δ |
| Ex. 3 | *A | 100 | 20 | 1 | 0.7 | ○ | ○ |
| Ex. 4 | *A | 100 | 20 | 1 | 0.7 | ◎ | ○ |
| Ex. 5 | *A | 100 | 20 | 1 | 0.7 | ◎ | ◎ |
| Ex. 6 | *A | 100 | 20 | 1 | 0.7 | ◎ | ◎ |
| Ex. 7 | *A | 100 | 20 | 1 | 0.7 | ◎ | ◎ |
| Ex. 8 | *A | 100 | 20 | 1 | 0.7 | ○ | ◎ |
| Ex. 9 | *A | 100 | 20 | 1 | 0.7 | Δ | ◎ |
| Ex. 10 | *A | 100 | 20 | 1 | 0.7 | Δ | ◎ |
| Ex. 11 | *A | 100 | 20 | 1 | 0.7 | ◎ | ◎ |
| Ex. 12 | *A | 100 | 20 | 1 | 0.7 | ○ | ○ |
| Ex. 13 | *A | 100 | 20 | 1 | 0.7 | ◎ | ◎ |
| Ex. 14 | *A | 100 | 20 | 1 | 0.7 | ○ | ○ |
| Ex. 15 | *A | 100 | 20 | 1 | 0.7 | ◎ | ◎ |
| Ex. 16 | *A | 100 | 20 | 1 | 0.7 | ◎ | ◎ |

TABLE 2-continued

| | | | | | | | |
|---|---|---|---|---|---|---|---|
| Ex. 17 | * A | 100 | 20 | 1 | 0.7 | ○ | ◎ |
| Ex. 18 | * A | 100 | 20 | 1 | 0.7 | Δ | ◎ |
| Ex. 19 | * B | 100 | 20 | 1 | 0.7 | ◎ | ◎ |
| Ex. 20 | * C | 100 | 20 | 1 | 0.7 | ◎ | ◎ |
| Ex. 21 | * D | 100 | 20 | 1 | 0.7 | ○ | ○ |

| | Composition of surface-treating solution | | | | | | |
|---|---|---|---|---|---|---|---|
| | Polycaboxylic acid polymer | | Zirconium compound | | coating contents (mg/m$^2$) | | Peak height ratio | Crosslinking ratio |
| | Kind | Amount of solid component (parts) | Amount of solid component (parts) | Amount calculated as zirconium (parts) | C | Zr | ($\beta/\alpha$) | (%) |
| Ex. 22 | PAA1 | 100 | 50 | 37 | 34 | 17 | 1.00 | 50 |
| Ex. 23 | PAA1 | 100 | 50 | 37 | 34 | 17 | 1.00 | 50 |
| Ex. 24 | PAA1 | 100 | 50 | 37 | 34 | 17 | 1.00 | 50 |
| Ex. 25 | PAA1 | 100 | 50 | 37 | 34 | 17 | 1.00 | 50 |
| Ex. 26 | PAA1 | 100 | 50 | 37 | 34 | 17 | 1.00 | 50 |
| Ex. 27 | PAA1 | 100 | 50 | 37 | 34 | 17 | 1.00 | 50 |
| Ex. 28 | PAA1 | 100 | 50 | 37 | 34 | 17 | 1.00 | 50 |
| Ex. 29 | PAA1 | 100 | 50 | 37 | 34 | 17 | 1.00 | 50 |
| Ex. 30 | PAA1 | 100 | 50 | 37 | 34 | 17 | 1.00 | 50 |
| Ex. 31 | PAA1 | 100 | 50 | 37 | 34 | 17 | 1.00 | 50 |
| Ex. 32 | PAA1 | 100 | 50 | 37 | 34 | 17 | 1.00 | 50 |
| Ex. 33 | PAA1 | 100 | 50 | 37 | 34 | 17 | 1.00 | 50 |
| Ex. 34 | PAA1 | 100 | 50 | 37 | 34 | 17 | 1.00 | 50 |
| Ex. 35 | PAA1 | 100 | 50 | 37 | 34 | 17 | 1.00 | 50 |
| Ex. 36 | PAA1 | 100 | 50 | 37 | 34 | 17 | 1.00 | 50 |
| Comp. Ex. 1 | PAA1 | 100 | 50 | 37 | 34 | 17 | 1.00 | 50 |
| Comp. Ex. 2 | none | — | — | — | — | — | — | — |
| Comp. Ex. 3 | PAA1 | 100 | 0 | 0 | 32 | 0 | 0.00 | 0 |
| Comp. Ex. 4 | PAA1 | 100 | 50 | 50 | 34 | 17 | 1.00 | 50 |
| Comp. Ex. 5 | PAA1 | 100 | 50 | 50 | 34 | 17 | 1.00 | 50 |
| Comp. Ex. 6 | treated with chromium phosphate | | | | Cr20 | | — | — |

| | Composition of the aqueous coating material | | | | Results of evaluation | |
|---|---|---|---|---|---|---|
| | Polyester resin | Phenol resin | Acid catalyst | | | |
| | Kind | Amount of solid component (parts) | Amount of solid component (parts) | Amount of solid component (parts) | coating thickness (μm) | Hot water-resistant adhering property | Dent resistance |
| Ex. 22 | * E | 100 | 20 | 1 | 0.7 | ◎ | ○ |
| Ex. 23 | * F | 100 | 20 | 1 | 0.7 | ◎ | ◎ |
| Ex. 24 | * G | 100 | 20 | 1 | 0.7 | ◎ | ◎ |
| Ex. 25 | * H | 100 | 20 | 1 | 0.7 | ◎ | ○ |
| Ex. 26 | * I | 100 | 20 | 1 | 0.7 | ◎ | ○ |
| Ex. 27 | * J | 100 | 20 | 1 | 0.7 | Δ | Δ |
| Ex. 28 | * K | 100 | 20 | 1 | 0.7 | ◎ | Δ |
| Ex. 29 | * L | 100 | 20 | 1 | 0.7 | ◎ | Δ |
| Ex. 30 | * A | 100 | 5 | 1 | 0.7 | Δ | ◎ |
| Ex. 31 | * A | 100 | 10 | 1 | 0.7 | ○ | ◎ |
| Ex. 32 | * A | 100 | 40 | 1 | 0.7 | ◎ | ○ |
| Ex. 33 | * A | 100 | 50 | 1 | 0.7 | ◎ | Δ |
| Ex. 34 | * A | 100 | 20 | 0.5 | 0.7 | ○ | ◎ |
| Ex. 35 | * A | 100 | 20 | 3 | 0.7 | ◎ | ○ |
| Ex. 36 | * A | 100 | 20 | 1 | 3 | ◎ | ◎ |
| Comp. Ex. 1 | none | — | — | — | — | ◎ | X |
| Comp. Ex. 2 | * A | 100 | 20 | 1 | 0.7 | X | ◎ |
| Comp. Ex. 3 | * A | 100 | 20 | 1 | 0.7 | Δ | X |
| Comp. Ex. 4 | * A | 100 | 0 | 1 | 0.7 | X | ◎ |
| Comp. Ex. 5 | * A | 100 | 20 | 0 | 0.7 | X | ◎ |
| Comp. Ex. 6 | none | — | — | — | — | ◎ | X |

* polyester resin

INDUSTRIAL APPLICABILITY

When the seamless cans are formed by using the surface-treated metal sheet and the organic resin-covered surface-treated metal sheet of the invention, there is realized excellent dent resistance to cope with even those strongly corrosive contents. Even when the seamless cans are subjected to a high-temperature and wet environment during the step of sterilization or the like, there is obtained excellent hot water-resistant adhering property without permitting the organic resin film to peel off. Therefore, the surface-treated metal sheet and the organic resin-covered surface-treated metal sheet of the invention can be favorably used for producing can bodies and can lids for containing such contents as acidic beverages and the like.

DESCRIPTION OF REFERENCE NUMERALS

1 organic resin-covered surface-treated metal sheet
2 metal sheet 3 surface-treatment coating
4 polyester coating
5 organic resin film

The invention claimed is:

1. A surface-treated metal sheet comprising a metal sheet, a surface-treatment coating that contains a polycarboxylic acid type polymer and a zirconium compound and that is formed on at least one surface of said metal sheet, and a coating that contains a polyester resin, a phenol resin and an acid catalyst and that is formed on said surface-treatment coating,
   said polycarboxylic acid type polymer is a polymer or a copolymer obtained by polymerization of at least one kind of polymerizable monomer selected from acrylic acid, methacrylic acid, itaconic acid and maleic acid, or is a mixture thereof, and
   the content of said polycarboxylic acid type polymer in said surface-treatment coating is not less than 50% by mass relative to the total solid component in the surface-treatment coating.

2. The surface-treated metal sheet according to claim 1, wherein when said surface-treatment coating is measured for its infrared absorption spectra, a peak height ratio ($\beta/\alpha$) of a maximum absorption peak height ($\alpha$) in a wave number range of 1660 to 1760 $cm^{-1}$ and a maximum absorption peak height ($\beta$) in a wave number range of 1490 to 1659 $cm^{-1}$ is from 0.20 to 2.54.

3. The surface-treated metal sheet according to claim 1, wherein said zirconium compound is a zirconium compound derived from an oxyzirconium salt.

4. The surface-treated metal sheet according to claim 1, wherein in said surface-treatment coating, the content of said polycarboxylic acid type polymer is 10 to 100 $mg/m^2$ calculated as carbon and the content of said zirconium compound is 2 to 80 $mg/m^2$ calculated as zirconium.

5. The surface-treated metal sheet according to claim 1, wherein said polyester resin has a glass transition temperature (Tg) of 15° C. to 80° C.

6. The surface-treated metal sheet according to claim 1, wherein said polyester resin contains an aromatic dicarboxylic acid and an aliphatic dicarboxylic acid having 6 to 14 carbon atoms as the dicarboxylic acid components for constituting the polyester resin, the molar ratio of the aromatic dicarboxylic acid and the aliphatic dicarboxylic acid having 6 to 14 carbon atoms being 95:5 to 80:20.

7. The surface-treated metal sheet according to claim 1, wherein said phenol resin is the one in which a methylol group of the phenol resin derived from the m-cresol is alkoxymethylated with an n-butanol.

8. The surface-treated metal sheet according to claim 1, wherein said phenol resin is contained in an amount in a range of 5 to 50 parts by mass per 100 parts by mass of said polyester resin.

9. The surface-treated metal sheet according to claim 1, wherein said coating is formed by using an aqueous coating composition that contains a water-soluble and/or a water-dispersible polyester resin, a phenol resin, an acid catalyst and an aqueous medium.

10. An organic resin-covered surface-treated metal sheet obtained by forming an organic resin film on the coating formed on the surface-treatment coating of the surface-treated metal sheet described in claim 1.

11. The organic resin-covered surface-treated metal sheet according to claim 10, wherein said organic resin film is a polyester resin film.

12. A can body made from the organic resin-covered surface-treated metal sheet of claim 10.

13. A can lid made from the surface-treated metal sheet of claim 1.

14. A can lid made from the organic resin-covered surface-treated metal sheet of claim 10.

* * * * *